(12) United States Patent
Hitomi et al.

(10) Patent No.: US 10,633,252 B2
(45) Date of Patent: Apr. 28, 2020

(54) SURFACE-MODIFIED INORGANIC SUBSTANCE, METHOD FOR MANUFACTURING SAME, RESIN COMPOSITION, THERMALLY CONDUCTIVE MATERIAL, AND DEVICE

(71) Applicant: FUJIFILM Corporation, Tokyo (JP)

(72) Inventors: Seiichi Hitomi, Kanagawa (JP); Keita Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/045,714

(22) Filed: Jul. 25, 2018

(65) Prior Publication Data

US 2018/0327265 A1 Nov. 15, 2018

Related U.S. Application Data

(63) Continuation of application No. PCT/JP2017/002467, filed on Jan. 25, 2017.

(30) Foreign Application Priority Data

Jan. 26, 2016 (JP) .................................. 2016-012618
Jan. 23, 2017 (JP) .................................. 2017-009112

(51) Int. Cl.
*C01B 21/064* (2006.01)
*C08K 9/04* (2006.01)
(Continued)

(52) U.S. Cl.
CPC ............ *C01B 21/064* (2013.01); *C01B 21/06* (2013.01); *C01B 21/068* (2013.01);
(Continued)

(58) Field of Classification Search
CPC ..... C01B 21/068; C01B 35/14; C01B 21/064; C01B 21/06; C01B 21/0648;
(Continued)

(56) References Cited

U.S. PATENT DOCUMENTS 5,518,783 A 5/1996 Kawata et al.
6,136,225 A 10/2000 Meyer et al.
(Continued)

FOREIGN PATENT DOCUMENTS

JP S6187699 5/1986
JP H07281028 10/1995
(Continued)

OTHER PUBLICATIONS

Terutsune Osawa et al.,"Wide-Range 2D Lattice Correlation Unveiled for Columnarly Assembled Triphenylene Hexacarboxylic Esters", Angewandte Communications,vol. 51, Issue32, Aug. 6, 2012,pp. 7990-7993.

(Continued)

*Primary Examiner* — David T Karst
(74) *Attorney, Agent, or Firm* — JCIPRNET

(57) ABSTRACT

A surface-modified inorganic substance is obtained by performing surface modification on a inorganic nitride by using an aldehyde compound such as a compound represented by General Formula I. A resin composition contains the surface-modified inorganic substance and a monomer having a group selected from the group consisting of an oxetanyl group, an oxiranyl group, and a (meth)acrylate group.

$$Z_Z\text{—}X_X\text{—CHO} \qquad \text{General Formula I}$$

In the formula, $Z_Z$ represents a group selected from the group consisting of an amino group, a thiol group, a hydroxyl group, an isocyanate group, a carboxyl group, a carboxylic acid anhydride group, an oxetanyl group, an oxiranyl group, and a (meth)acrylate group, and $X_X$ represents a divalent linking group.

19 Claims, 1 Drawing Sheet

(51) Int. Cl.
  *C08L 101/02* (2006.01)
  *C01B 21/06* (2006.01)
  *C01B 21/068* (2006.01)
  *C01B 21/072* (2006.01)
  *C08G 65/22* (2006.01)
  *C01B 35/14* (2006.01)
  *C08G 18/76* (2006.01)
  *C08G 59/40* (2006.01)
  *C08K 9/06* (2006.01)
  *C08L 61/06* (2006.01)
  *C08L 61/34* (2006.01)
  *C08K 3/38* (2006.01)

(52) U.S. Cl.
  CPC ...... *C01B 21/0648* (2013.01); *C01B 21/0687* (2013.01); *C01B 21/0728* (2013.01); *C01B 35/14* (2013.01); *C08G 18/76* (2013.01); *C08G 59/40* (2013.01); *C08G 65/22* (2013.01); *C08K 9/04* (2013.01); *C08K 9/06* (2013.01); *C08L 61/06* (2013.01); *C08L 61/34* (2013.01); *C08L 101/02* (2013.01); *C08K 3/38* (2013.01); *C08K 2003/385* (2013.01)

(58) Field of Classification Search
  CPC . C01B 21/0687; C01B 21/0728; C08G 18/76; C08G 59/40; C08G 65/22; C08K 9/06; C08K 9/04; C08K 2003/385; C08K 3/38; C08L 61/06; C08L 61/34; C08L 101/02
  USPC ........................................................ 523/445
  See application file for complete search history.

(56) References Cited

U.S. PATENT DOCUMENTS

| | | | |
|---|---|---|---|
| 7,109,288 | B2 | 9/2006 | Akatsuka et al. |
| 7,445,797 | B2 | 11/2008 | Meneghetti et al. |
| 7,696,353 | B2 | 4/2010 | Takahashi et al. |
| 7,968,156 | B2 | 6/2011 | Tanaka et al. |
| 8,304,554 | B2 | 11/2012 | Takahashi et al. |
| 8,524,334 | B2 | 9/2013 | Hamasaki et al. |
| 8,741,513 | B2 | 6/2014 | Takahashi et al. |
| 8,981,108 | B2 | 3/2015 | Hamasaki et al. |
| 9,481,658 | B2 | 11/2016 | Hamasaki et al. |
| 2004/0265203 | A1 | 12/2004 | Ohtsubo et al. |
| 2006/0276568 | A1 | 12/2006 | Akatsuka et al. |
| 2010/0292508 | A1 | 11/2010 | Rajendran |
| 2012/0315487 | A1 | 12/2012 | Takezawa et al. |
| 2015/0069288 | A1* | 3/2015 | Hong ............... C09K 5/14 252/71 |
| 2015/0291814 | A1* | 10/2015 | Castano ............... C09D 5/00 252/62 |

FOREIGN PATENT DOCUMENTS

| | | |
|---|---|---|
| JP | H07306317 | 11/1995 |
| JP | 2696480 | 1/1998 |
| JP | H11323162 | 11/1999 |
| JP | H11513019 | 11/1999 |
| JP | 2001192500 | 7/2001 |
| JP | 2005156822 | 6/2005 |
| JP | 2006076992 | 3/2006 |
| JP | 2006257392 | 9/2006 |
| JP | 2006301614 | 11/2006 |
| JP | 2007002220 | 1/2007 |
| JP | 2008013759 | 1/2008 |
| JP | 4118691 | 7/2008 |
| JP | 2010125782 | 6/2010 |
| JP | 2010244038 | 10/2010 |
| JP | 4858470 | 1/2012 |
| JP | 2012067225 | 4/2012 |
| JP | 2012176886 | 9/2012 |
| JP | 2012526830 | 11/2012 |
| JP | 2013227451 | 11/2013 |
| JP | 5385937 | 1/2014 |
| JP | 5479175 | 4/2014 |
| JP | 5620129 | 11/2014 |
| JP | 2015052710 | 3/2015 |
| WO | 9700600 | 1/1997 |
| WO | 2004069399 | 8/2004 |

OTHER PUBLICATIONS

Maruzen Co., Ltd.,"Liquid Crystal Handbook",the manual of Liquid Crystal Handbook, with brief English explanation, publish on Oct. 30, 2000, pp. 330-333.

Yoshitaka Takezawa, "Highly Thermally Conductive Composite Material",CMC Publishing Co.,LTD., with brief English explanation, Jan. 26, 2011, pp. 63-78.

J. Diao et al., A surface modification strategy on silicon nitride for developing biosensors, Analytical Biochemistry, Aug. 15, 2005, pp. 322-328.

"International Search Report (Form PCT/ISA/210) of PCT/JP2017/002467", dated Mar. 7, 2017, with English translation thereof, pp. 1-5.

"International Preliminary Report on Patentability (Form PCT/IPEA/409) of PCT/JP2017/002467", dated Apr. 6, 2018, with English translation thereof, pp. 1-14.

"Office Action of Japan Counterpart Application," with English translation thereof, dated Jul. 9, 2019, pp. 1-8.

"Office Action of Korea Counterpart Application," with English translation thereof, dated Jul. 8, 2019, pp. 1-7.

"Office Action of Korea Counterpart Application," with machine English translation thereof, dated Jan. 16, 2020, p. 1-p. 10.

* cited by examiner

SURFACE-MODIFIED INORGANIC SUBSTANCE, METHOD FOR MANUFACTURING SAME, RESIN COMPOSITION, THERMALLY CONDUCTIVE MATERIAL, AND DEVICE

CROSS-REFERENCE TO RELATED APPLICATIONS

This application is a continuation of PCT International Application No. PCT/JP2017/002467 filed on Jan. 25, 2017, which claims priority under 35 U.S.C § 119 (a) to Japanese Patent Applications Nos. 2016-012618 and 2017-009112 filed on Jan. 26, 2016 and Jan. 23, 2017, respectively, the entire contents of which are incorporated herein by reference.

BACKGROUND OF THE INVENTION

1. Field of the Invention

The present invention relates to a surface-modified inorganic substance and a method for manufacturing the same. Furthermore, the present invention relates to a resin composition containing the surface-modified inorganic substance. The present invention also relates to a thermally conductive material formed of the resin composition and a device including the thermally conductive material.

2. Description of the Related Art

An inorganic nitride has a wide range of application as a pigment, a catalyst, an electrode material, a semiconductor material, a heat dissipation material, a thermally conductive material, a lubricant, and the like, and is used in various fields in the form of granules or a substrate. In a case where the surface of the inorganic nitride is modified, the dispersibility of the inorganic nitride in an organic material or the affinity between the inorganic nitride and an organic material is improved. Accordingly, the range of application can widen.

As a method for modifying the surface of an inorganic nitride, JP2006-257392A discloses a method in which silane, aluminate, or a titanate coupling agent is caused to react with the surface of an inorganic nitride particle such that the surface of the inorganic nitride particle is modified. Furthermore, JP2001-192500A reports a method of mixing boron nitride with 1,4-phenylene diisocyanate and heating the mixture in a solvent under reflux. In addition, JP4858470B describes a method of using a compound, which has two reaction points including an anhydride portion and an acid chloride portion, and an aromatic diamino compound.

SUMMARY OF THE INVENTION

By the surface modification of an inorganic nitride, the affinity or reactivity between the inorganic nitride and a resin binder in the aforementioned resin composition is also improved. The compound for the surface modification of the inorganic nitride needs to have the characteristics for modifying the surface of the inorganic nitride and the characteristics appropriate for the resin binder used. For example, with the method described in JP2006-257392A, because the inorganic nitride has a small number of hydroxyl groups, which becomes a point of a reaction with silane or the like, on the surface thereof, it is difficult to bring about a sufficient surface modification effect. Meanwhile, with the methods described in JP2001-192500A, JP4858470B, and the like, the reaction for surface modification needs to be stepwise performed, and hence the process is complicated.

An object of the present invention is to provide a surface-modified inorganic substance obtained by performing surface modification exhibiting high adsorptivity with respect to an inorganic nitride. Another object of the present invention is to provide a simple method for manufacturing the surface-modified inorganic substance. Another object of the present invention is to provide a resin composition, which makes it possible to obtain a thermally conductive material having excellent thermal conductivity, a thermally conductive material having excellent thermal conductivity, and a device having high durability.

In order to achieve the aforementioned objects, the inventor of the present invention attempted to modify the surface of an inorganic nitride by using various compounds. As a result, the inventor obtained knowledge that an aldehyde compound exhibits markedly high adsorptivity with respect to the inorganic nitride. The inventor also obtained knowledge that in a case where an aldehyde compound is used, the surface of an inorganic nitride can be much more easily modified than in a case where the methods disclosed in JP2006-257392A, JP2001-192500A, and JP4858470B are used. Based on the knowledge, the inventor of the present invention repeated examinations and has accomplished the present invention.

That is, the present invention provides [1] to [20] described below.

[1] A surface-modified inorganic substance obtained by performing surface modification on an inorganic nitride by using an aldehyde compound.

[2] The surface-modified inorganic substance described in [1], in which the aldehyde compound is a compound represented by General Formula I.

$$Z_Z-X_X-CHO \qquad \text{General Formula I}$$

In the formula, $Z_Z$ represents a group selected from the group consisting of an amino group, a thiol group, a hydroxyl group, an isocyanate group, a carboxyl group, a carboxylic acid anhydride group, an oxetanyl group, an oxiranyl group, a (meth)acrylate group, and a hydrogen atom, and $X_X$ represents a divalent linking group.

[3] The surface-modified inorganic substance described in [1] or [2], in which the aldehyde compound has a structure including two or more non-fused monocyclic aromatic rings or a fused ring in which three or more monocyclic aromatic rings are fused.

[4] The surface-modified inorganic substance described in [1] or [2], in which the aldehyde compound has a structure including a fused ring in which three or more monocyclic aromatic rings are fused.

[5] The surface-modified inorganic substance described in any one of [1] to [4], in which the inorganic nitride includes boron, aluminum, or silicon.

[6] The surface-modified inorganic substance described in [5], in which the inorganic nitride is boron nitride.

[7] The surface-modified inorganic substance described in [5], in which the inorganic nitride is aluminum nitride.

[8] The surface-modified inorganic substance described in any one of [1] to [7], in which the surface modification is modification based on the formation of a covalent bond that the aldehyde compound forms with a surface of the inorganic nitride.

[9] A resin composition comprising the surface-modified inorganic substance described in any one of [1] to [8], and a monomer having a group selected from the group consisting of an oxetanyl group, an oxiranyl group, and a (meth)acrylate group.

[10] The resin composition described in [9], in which the monomer has an oxiranyl group.

[11] The resin composition described in [10], in which the aldehyde compound has a group selected from the group consisting of an amino group, a thiol group, a hydroxyl group, an isocyanate group, a carboxyl group, and a carboxylic acid anhydride group.

[12] The resin composition described in [10], further comprising a curing agent having a group selected from the group consisting of an amino group, a thiol group, a hydroxyl group, an isocyanate group, a carboxyl group, and a carboxylic acid anhydride group.

[13] The resin composition described in [12], in which the aldehyde compound has an oxiranyl group.

[14] A thermally conductive material comprising the surface-modified inorganic substance described in any one of [1] to [8].

[15] A thermally conductive material comprising a cured substance of the resin composition described in any one of [9] to [13].

[16] The thermally conductive material described in [14] or [15] that is in the form of a sheet.

[17] The thermally conductive material described in [16] that is a heat dissipation sheet.

[18] A device comprising the thermally conductive material described in any one of [14] to [17].

[19] A lubricant comprising the surface-modified inorganic substance described in any one of [1] to [8].

[20] A method for manufacturing the surface-modified inorganic substance described in any one of [1] to [8], comprising making a contact between the aldehyde compound and the inorganic nitride.

[21] The manufacturing method described in [20], in which the contact is made by stirring a solution containing the inorganic nitride and the aldehyde compound.

[22] The manufacturing method described in [21], in which a solvent of the solution is ethyl acetate, methyl ethyl ketone, or dichloromethane.

According to the present invention, there is provided a surface-modified inorganic substance obtained by performing surface modification exhibiting high adsorptivity with respect to an inorganic nitride. The present invention also provides a simple method for manufacturing the surface-modified inorganic substance. A resin composition containing the surface-modified inorganic substance of the present invention can provide a thermally conductive material having excellent thermal conductivity and a device having high durability.

DESCRIPTION OF THE PREFERRED EMBODIMENTS

Figure 1:
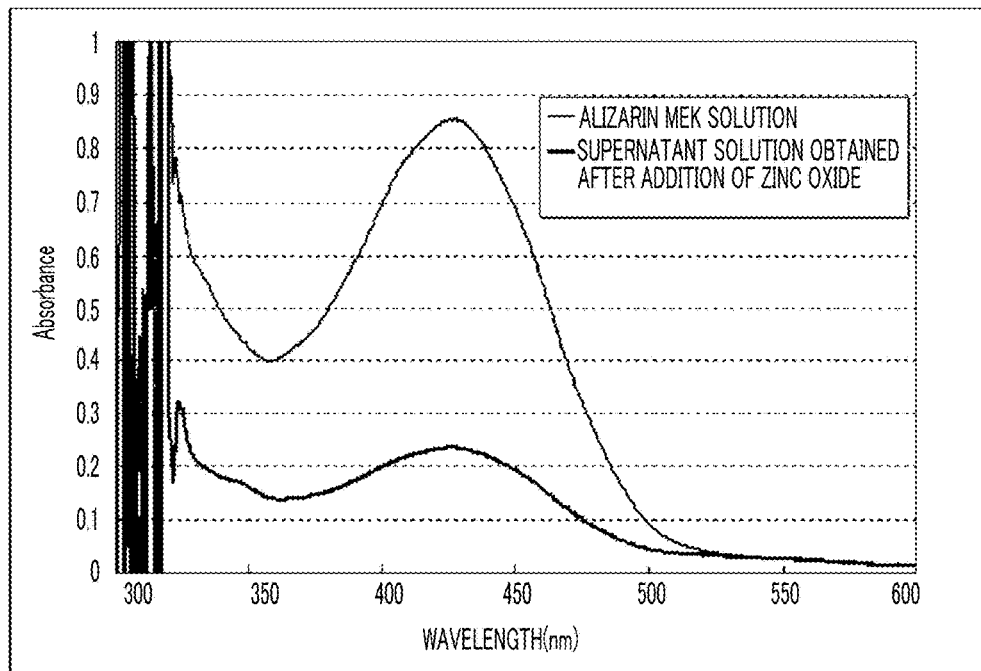
FIG. 1 is a view showing visible absorption spectra of an alizarin solution and a filtrate of the alizarin solution to which zinc oxide is added.

Hereinafter, the present invention will be specifically described.

In the present specification, "to" means that the numerical values listed before and after "to" are of a lower limit and an upper limit, respectively. In the present specification, the description of "(meth)acryl group" means "either or both of an acryl group and a methacryl group". The same is true for the description of "(meth)acrylate" or the like.

In the present specification, "surface-modified" means a state where an organic substance is adsorbed onto at least a portion of the surface of an inorganic substance. The way the organic substance is adsorbed is not particularly limited, and the organic substance may be in a bonded state. That is, "surface-modified" includes a state where an organic group obtained by the dissociation of a portion of an organic substance forms a bond with the surface of an inorganic substance. The bond may be any one of a covalent bond, a coordinate bond, an ionic bond, a hydrogen bond, a van der Waals bond, and a metallic bond, but is preferably a covalent bond. In the "surface-modified" state, a monolayer may be formed on at least a portion of the surface. The monolayer is a monolayer film formed by the chemical adsorption of organic molecules, and is known as Self-Assembled Monolayer (SAM). The organic substance is a so-called organic compound, and means a carbon atom-containing compound excluding carbon monoxide, carbon dioxide, carbonate, and the like that are customarily classified as an inorganic compound. In the present specification, the "surface-modified" state may be established on only a portion of the surface of an inorganic substance or on the entirety of the surface of an inorganic substance.

In the present specification, "surface-modified inorganic substance" means an inorganic substance whose surface is modified, that is, a substance in which an organic substance is adsorbed onto the surface of an inorganic substance.

<Inorganic Substance>

As the inorganic substance in the surface-modified inorganic substance of the present invention, an inorganic nitride is used. The inorganic substance may be an inorganic oxynitride. The shape of the inorganic substance is not particularly limited, and may be granular, film-like, or plate-like.

The granules may have a rice grain shape, a spherical shape, a cubical shape, a spindle shape, a scale shape, an aggregated shape, or an amorphous shape.

The inorganic nitride is not particularly limited, and examples thereof include boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), zirconium nitride (ZrN), and the like.

The above inorganic nitrides may be used singly, or plural kinds thereof may be used in combination.

The inorganic nitride in the surface-modified inorganic substance of the present invention preferably includes aluminum, boron, or silicon, and is preferably aluminum nitride, boron nitride, or silicon nitride.

<Aldehyde Compound>

The surface modification of the surface-modified inorganic substance of the present invention performed using an aldehyde compound. The aldehyde compound may modify the surface of an inorganic substance by reacting with the surface of the inorganic substance through the portion of an aldehyde group. The aldehyde compound may be a compound represented by General Formula I shown below, for example.

$$Z_Z-X_X-CHO \qquad \text{General Formula I}$$

In the formula, $Z_Z$ represents a group selected from the group consisting of an amino group, a thiol group, a hydroxyl group, an isocyanate group, a carboxyl group, a carboxylic acid anhydride group, an oxetanyl group, an oxiranyl group, a (meth)acrylate group, and a hydrogen atom. $X_X$ represents a divalent linking group.

In the present specification, an oxiranyl group is a functional group referred to as an epoxy group as well. The oxiranyl group may be a group including oxacyclopropane (oxirane), and also includes a group, in which two adjacent carbon atoms in a saturated hydrocarbon ring group form an oxirane ring by being bonded to each other through an oxo group (—O—), and the like, for example.

In the present specification, in a case where "hydroxyl group" is exemplified as a functional group, the hydroxyl group is preferably a hydroxyl group directly bonded to an aromatic ring such as a phenyl group. Furthermore, the carboxylic acid anhydride group may be a substituent obtained by removing any hydrogen atom from an acid anhydride such as maleic acid anhydride, phthalic acid anhydride, pyromellitic acid anhydride, or trimellitic acid anhydride.

$X_X$ contains at least one linking group A selected from the group consisting of a divalent aliphatic hydrocarbon group which may have a substituent, an arylene group which may have a substituent, and a heteroarylene group which may have a substituent. $X_X$ may contain one or more linking groups B selected from the group consisting of —O—, —CO—, —NH—, —CO—NH—, —COO—, and —O—COO—. That is, $X_X$ is the linking group A, a linking group constituted with a combination of two or more linking groups A, or a linking group constituted with a combination of one or more linking groups A and one or more linking groups B.

The divalent aliphatic hydrocarbon group which may have a substituent include an alkylene group which may have a substituent and an alkenylene group which may have a substituent.

In the present specification, the alkyl group may be linear, branched, or cyclic. The number of carbon atoms in the alkyl group is preferably 1 to 30, and more preferably 2 to 10. Specific examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, a 2-norbornyl group, and the like. The above description relating to the alkyl group is also applied to other groups such as an alkyl group-containing alkoxy group. The alkylene group is a group obtained by removing a certain hydrogen atom from the alkyl group, and examples of the alkylene group include the groups obtained by removing a certain hydrogen atom from each of the aforementioned examples of the alkyl group.

In the present specification, the alkenyl group may be linear, branched, or cyclic. The number of carbon atoms in the alkenyl group is preferably 2 to 30, and more preferably 2 to 10. Specific examples of the alkenyl group include a vinyl group, a 1-propenyl group, a 1-butenyl group, a 1-methyl-1-propenyl group, a 1-cyclopentenyl group, a 1-cyclohexenyl group, and the like. The above description relating to the alkenyl group is also applied to other groups containing the alkenyl group. The alkenylene group is a group obtained by removing a certain hydrogen atom from the alkenyl group, and examples of the alkenylene group include the groups obtained by removing a certain hydrogen atom from each of the aforementioned examples of the alkenyl group.

The aryl group may be a monocyclic group or a ring-fused group containing two or more rings. The number of carbon atoms in the aryl group is preferably 5 to 18, and more preferably 5 to 10. Specific examples of the aryl group include a phenyl group, a naphthyl group, an anthryl group, a phenanthryl group, an indenyl group, an acenaphthenyl group, a fluorenyl group, a pyrenyl group, and the like. The arylene group is a group obtained by removing any hydrogen atom from the aryl group, and examples of the arylene group include the groups obtained by removing any hydrogen atom from each of the aforementioned examples of the aryl group.

Examples of the heteroaryl group include heteroaryl groups obtained by removing one hydrogen atom on a heterocyclic aromatic ring containing one or more hetero atoms selected from the group consisting of a nitrogen atom, an oxygen atom, and a sulfur atom. Specific examples of the heterocyclic aromatic ring containing one or more hetero atoms selected from the group consisting of a nitrogen atom, an oxygen atom, and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranyl, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, and the like. The heteroarylene group is a group obtained by removing a certain hydrogen atom from the heteroaryl group, and examples of the heteroarylene group include the groups obtained by removing a certain hydrogen atom from each of the aforementioned examples of the heteroaryl group.

In the present specification, in a case where the description of "may have a substituent" appears, the type of a substituent, the position of a substituent, and the number of substituents are not particularly limited. The number of substituents may, for example, be 1, 2, 3, or greater. Examples of the substituent include a group of monovalent nonmetallic atoms excluding hydrogen, and the substituent can be selected from the following substituent group Y for example.

Substituent group Y: halogen atom (—F, —Br, —Cl, or —I), a hydroxyl group, an alkoxy group, an aryloxy group, a mercapto group, an alkylthio group, an arylthio group, an alkyldithio group, an aryldithio group, an amino group, a N-alkylamino group, a N,N-dialkylamino group, a N-arylamino group, a N,N-diarylamino group, a N-alkyl-N-arylamino group, an acyloxy group, a carbamoyloxy group, a N-alkylcarbamoyloxy group, a N-arylcarbamoyloxy group, a N,N-dialkylcarbamoyloxy group, a N,N-diarylcarbamoyloxy group, a N-alkyl-N-arylcarbamoyloxy group, an alkylsulfoxy group, an arylsulfoxy group, an acylthio group, an acylamino group, a N-alkylacylamino group, a N-arylacylamino group, a ureide group, a N'-alkylarylureide group, a N',N'-dialkylureide group, a N'-arylureide group, a N',N'-diarylureide group, a N'-alkyl-N-arylureide group, a N-alkylureide group, a N-arylureide group, a N'-alkyl-N-alkylureide group, a N'-alkyl-N-arylureide group, a N',N'-dialkyl-N-alkylureide group, a N',N'-dialkyl-N-arylureide group, a N'-aryl-N-alkylureide group, a N'-aryl-N-arylureide group, a N',N'-diaryl-N-alkylureide group, a N',N'-diaryl-N-arylureide group, a N'-alkyl-N'-aryl-N-alkylureide group, a N'-alkyl-N'-aryl-N-arylureide group, an alkoxycarbonylamino group, an aryloxycarbonylamino group, a N-alkyl-N-alkoxycarbonylamino group, a N-alkyl-N-aryloxycarbonylamino group, a N-aryl-N-alkoxycarbonylamino group, a N-aryl-N-aryloxycarbonylamino group, a formyl group, an acyl group, a carboxyl group and a conjugated base group thereof, an alkoxycarbonyl group, an aryloxycarbonyl group, a carbamoyl group, a N-alkylcarbamoyl group, a N,N-dialkylcarbamoyl group, a N-arylcarbamoyl group, a N,N-diarylcarbamoyl group, a N-alkyl-N-arylcarbamoyl group, an alkylsufinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, a N-alkylsulfinamoyl group, a N,N-dialkylsulfinamoyl group, a N-arylsultinamoyl group, a N,N-diarylsulfinamoyl group, a N-alkyl-N-arylsulfinamoyl group, a sulfamoyl group, a N-alkylsulfamoyl group, a N,N-dialkylsulfamoyl group, a N-arylsulfamoyl group, a N,N-diarylsulfamoyl group, a N-alkyl-N-arylsulfamoyl group, a N-acylsulfamoyl group and a conjugated base group thereof, a N-alkylsulfonylsulfamoyl group (—SO$_2$NHSO$_2$(alkyl)) and a conjugated base group thereof, a N-arylsulfonylsulfamoyl group (—SO$_2$NHSO$_2$(aryl)) and a conjugated base group thereof, a N-alkylsulfonylcarbamoyl group (—CONHSO$_2$(alkyl)) and a conjugated base group thereof, a N-arylsulfonylcarbamoyl group (—CONHSO$_2$(aryl)) and a conjugated base group thereof, an alkoxysilyl group (—Si(Oalkyl)$_3$), an aryloxysilyl group (—Si(Oaryl)$_3$), a hydroxysilyl group (—Si(OH)$_3$) and a conjugated base group thereof, a phosphono group (—PO$_3$H$_2$) and a conjugated base group thereof, a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugated base group thereof, a monoarylphosphono group (—PO$_3$H(aryl)) and a conjugated base group thereof, a phosphonooxy group (—OPO$_3$H$_2$) and a conjugated base group thereof, a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugated base group thereof, a monoarylphosphonooxy group (—OPO$_3$H(aryl)) and a conjugated base group thereof, a cyano group, a nitro group, an aryl group, an alkenyl group, and an alkynyl group.

These substituents may form a ring with each other if possible or may form a ring by being bonded to the group substituted with the substituents.

$X_X$ in General Formula I is preferably a linking group containing a phenylene group which may have at least one substituent, and more preferably a linking group having a partial structure to which a phenylene group which may have two substituents is linked through —COO—. Furthermore, $X_X$ is preferably a linking group containing an unsubstituted phenylene group. It is particularly preferable that the unsubstituted phenylene group is directly bonded to a carbon atom derived from an aldehyde group.

$Z_Z$ in General Formula I is more preferably an amino group, a thiol group, a hydroxyl group, an isocyanate group, a carboxyl group, or a carboxylic acid anhydride group, and even more preferably an amino group, a thiol group, or a hydroxyl group. Particularly, in a case where the resin composition contains a curing agent having a group selected from the group consisting of an amino group, a thiol group, a hydroxyl group, an isocyanate group, a carboxyl group, or a carboxylic acid anhydride group as a curing agent, $Z_Z$ in General Formula I is also preferably an oxiranyl group.

It is also preferable that the aldehyde compound has a chain-like structure, because then a monolayer is easily formed.

Preferred examples of the aldehyde compound represented by General Formula I will be shown below, but the present invention is not limited thereto.

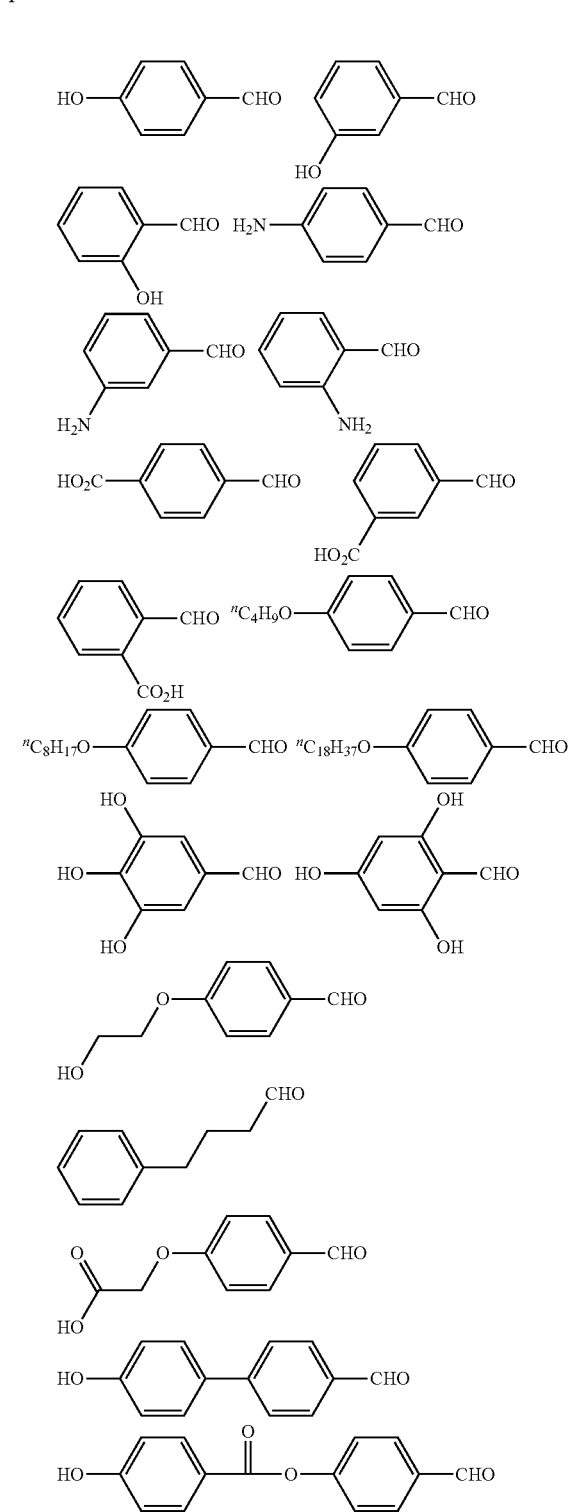

-continued

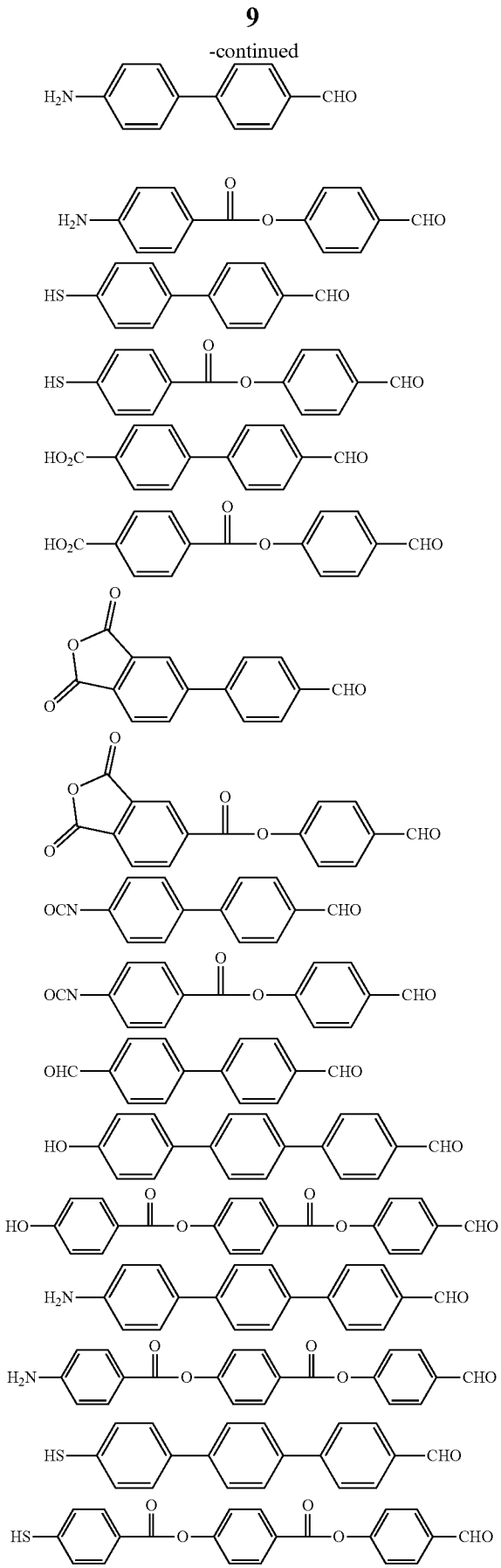

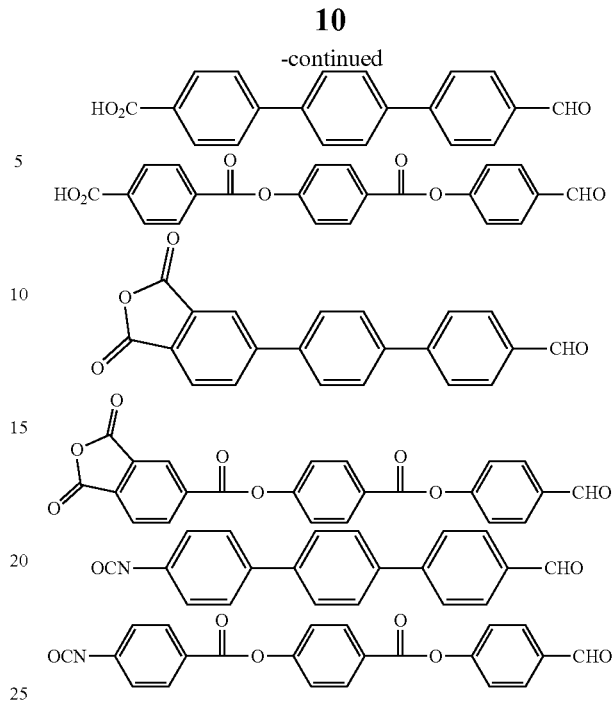

An aldehyde compound is also preferable which is easily decomposed by being brought into contact with an inorganic substance or easily decomposed in a solvent and generates the aldehyde compound represented by General Formula I. Examples of such a compound include the following ones.

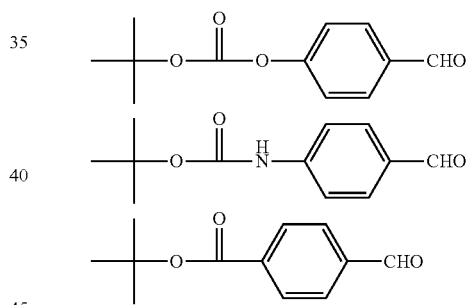

Furthermore, it is preferable that the aldehyde compound has a structure including two or more monocyclic aromatic rings. By the structure including two or more monocyclic aromatic rings, the adsorptivity with respect to an inorganic nitride can be further improved. In a case where the adsorptivity with respect to an inorganic nitride is improved, the aggregation of inorganic nitrides is inhibited, and hence inorganic nitrides are uniformly dispersed in a cured substance. As a result, the thermal conductivity of the cured substance is improved.

In the present specification, the monocyclic aromatic ring means a non-fused monocyclic aromatic ring or each of the monocyclic aromatic rings in a fused ring. The number of atoms constituting the ring is not particularly limited, but may be about 5 to 18. The number of atoms constituting the ring is preferably 5 to 10, and more preferably 5 or 6. The monocyclic aromatic ring may be an aromatic ring formed only of carbon or a heterocyclic aromatic ring containing elements other than carbon in the ring structure. Examples of the aromatic ring having a ring structure formed only of carbon include a benzene ring. Examples of the heterocyclic aromatic ring include an aromatic ring having one atom or two or more atoms selected from a sulfur atom, a nitrogen atom, and an oxygen atom. The heterocyclic aromatic ring preferably contains sulfur atoms, and more preferably contains one sulfur atom. Specific examples of the heterocyclic aromatic ring include a thiophene ring, a pyrrole ring, an imidazole ring, a pyrazole ring, a furan ring, an isothiazole ring, an isoxazole ring, a pyridine ring, a pyrazine ring, a pyrimidine ring, and the like. As the aromatic ring, a benzene ring or a thiophene ring is preferable, and a benzene ring is more preferable. The aldehyde compound more preferably includes three or more monocyclic aromatic rings, and even more preferably includes four or more monocyclic aromatic rings. It is also preferable that the aldehyde compound has, as a structure including two or more monocyclic aromatic rings, a fused ring in which two or more monocyclic aromatic rings are fused. In the present specification, for a fused ring, the number of fused monocyclic aromatic rings is counted as the number of monocyclic aromatic rings. That is, for example, an aldehyde compound having one fused ring in which three monocyclic aromatic rings are fused includes three monocyclic aromatic rings. In the present specification, particularly in a case where the number of non-fused monocyclic aromatic rings is mentioned, sometimes the description of "non-fused monocyclic aromatic ring" is used. As the fused ring, a ring in which three or more monocyclic aromatic rings are fused is more preferable, and a ring in which four or more monocyclic aromatic rings are fused is even more preferable. The monocyclic aromatic rings forming the fused ring may be the same as or different from each other. As the fused ring, a ring in which three or more benzene rings are fused is particularly preferable.

It is preferable that the aldehyde compound has a skeleton having high flatness. A fused ring is preferable because it has high flatness. In a case where the fused rings are constituted with the same number of rings, a structure having higher flatness is more preferable.

In the aldehyde compound having a structure including two or more benzene rings, it is preferable that an aldehyde group is directly bonded to the benzene rings.

The aldehyde compound having a structure including two or more benzene rings may be a compound represented by General Formula I. That is, $X_X$ in General Formula I may be a linking group including two or more benzene rings. In a case where $X_X$ in General Formula I is a linking group including two or more benzene rings, it is also preferable that $Z_Z$ in General Formula I is a hydrogen atom.

Examples of the aldehyde compound having a structure including two or more benzene rings will be shown below, but the present invention is not limited to the examples.

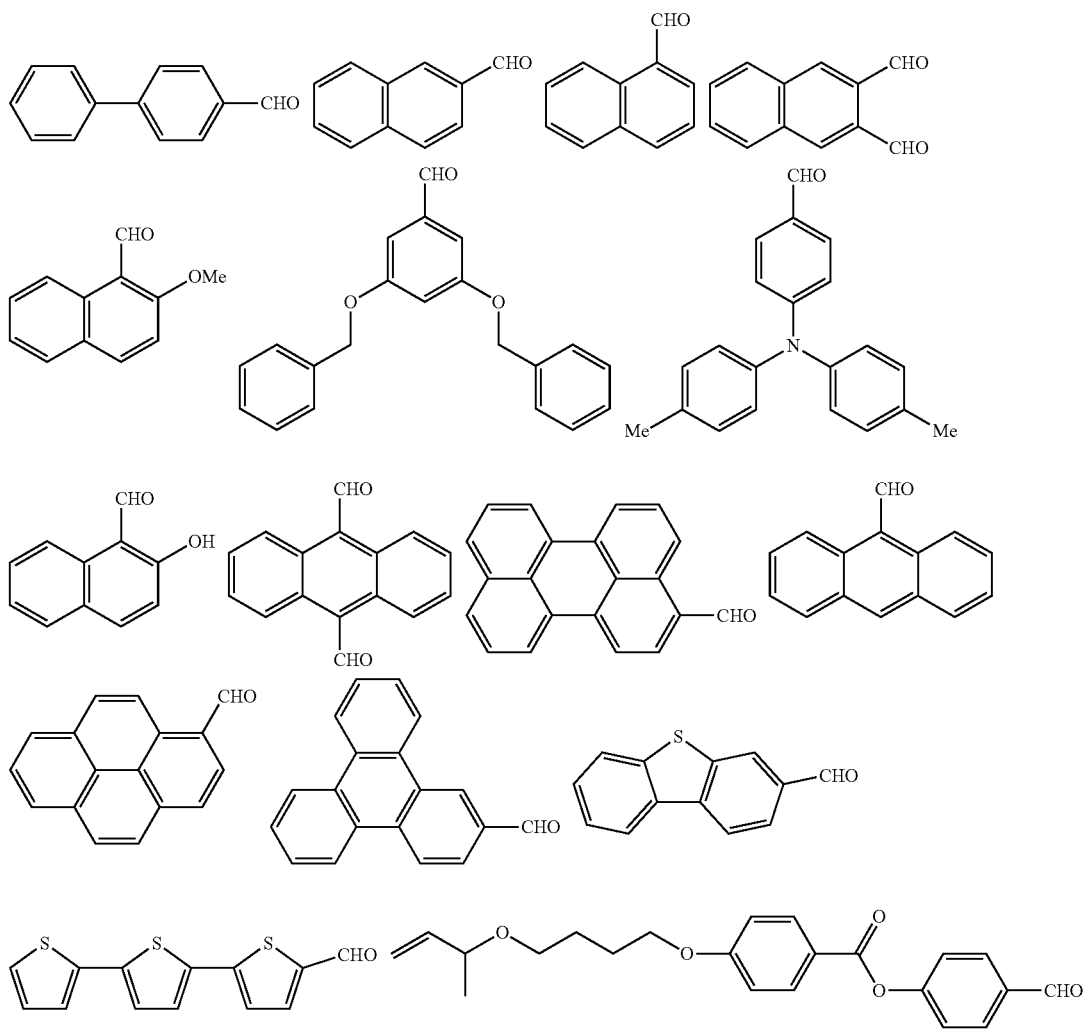

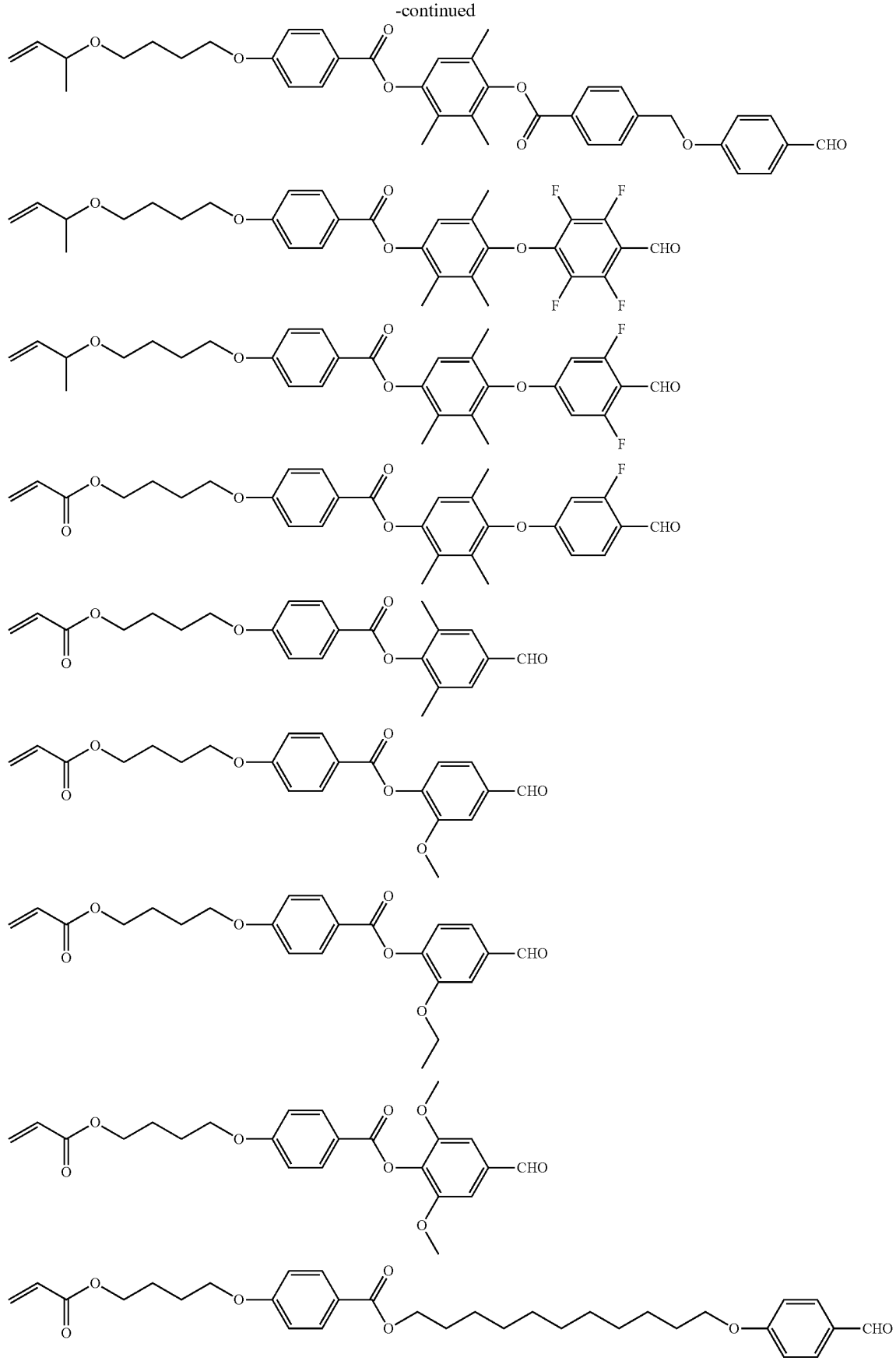

-continued

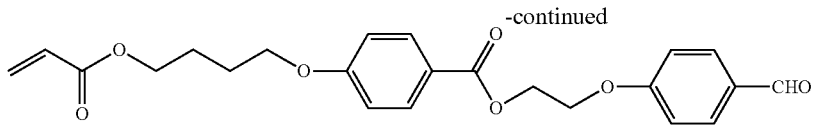

The higher the flatness of the structure of the aldehyde compound is as described above, the higher the adsorptivity tends to be with respect to an inorganic nitride. Likewise, the higher the electron density is, the higher the adsorptivity tends to be with respect to an inorganic nitride. Furthermore, the lower the bulkiness of the skeleton is for the molecular weight, the higher the adsorptivity tends to be with respect to an inorganic nitride.

As the aldehyde compound, a commercial aldehyde compound may be used as it is. Alternatively, the aldehyde compound may be synthesized.

An aromatic aldehyde can be synthesized through the Vilsmeier reaction of the corresponding compound. Furthermore, an aliphatic aldehyde can be synthesized by an oxidation reaction of the corresponding compound.

<Surface-modified Inorganic Substance>

In the surface-modified inorganic substance, the aldehyde compound modifies the surface of an inorganic nitride. It is preferable that the aldehyde compound performs surface modification by conducting a chemical reaction with the inorganic nitride. Presumably, the aldehyde compound may react with a —$NH_2$ group on the surface of an inorganic substance and form a bond represented by —N=CH—. For example, in a case where the compound represented by General Formula I is used as the aldehyde compound, organic chains represented by $Z_Z$—$X_X$— can exist on the surface of the inorganic nitride through the aforementioned bond. The organic chains may then form a monolayer preferably in an arrayed state.

The shape of the surface-modified inorganic substance of the present invention is not particularly limited, and may be granular, film-like, or plate-like. The granular surface-modified inorganic substance may be made into finer granules by using a treatment such as dispersion. Furthermore, the surface-modified inorganic substance may have the shape of a nanosheet, a nanotube, a nanorod, or the like.

<Method for Manufacturing Surface-modified Inorganic Substance>

The surface-modified inorganic substance can be easily manufactured by making a contact between an inorganic nitride and the aldehyde compound. The contact between the inorganic nitride and the aldehyde compound can be established by, for example, stirring a solution containing the inorganic nitride and the aldehyde compound. Particularly, in a case where the inorganic nitride is granular, it is preferable to make the contact by stirring.

A solvent of the aforementioned solution is not particularly limited, but is preferably an organic solvent. Examples of the organic solvent include ethyl acetate, methyl ethyl ketone (MEK), dichloromethane, tetrahydrofuran (THF), and the like.

The aforementioned solution may contain other components such as a resin binder, which will be described later, and the like. From a composition containing an inorganic nitride, an aldehyde compound, and a resin binder, it is possible to easily manufacture a resin composition containing a surface-modified inorganic substance and a resin binder.

A mixing ratio between the inorganic nitride and the aldehyde compound may be determined in consideration of the structure such as the structure and the surface area of the inorganic nitride, the aspect ratio of the molecule of the aldehyde compound, and the like.

The stirring conditions are not particularly limited. For example, stirring may be performed at room temperature or may be performed for about 1 to 10 seconds at a stirring rotation speed of about 50 rpm.

<Resin Composition>

In the surface-modified inorganic substance of the present invention, the surface of an inorganic nitride is modified using the aldehyde compound described above, and accordingly, the dispersibility of the inorganic nitride in an organic solvent, a water solvent, a resin, or the like is improved. By exploiting such characteristics, the modified inorganic substance can be applied to various fields as a resin composition by being additionally mixed with a resin binder.

The resin binder may be a main agent having a group selected from the group consisting of an oxetanyl group, an oxiranyl group, and a (meth)acrylate group.

The resin composition may contain one kind of surface-modified inorganic substance or two or more kinds of surface-modified inorganic substances. Furthermore, the resin composition may contain one kind of resin binder or two or more kinds of resin binders.

The resin composition may contain, in addition to the surface-modified inorganic substance and the resin binder (main agent), a curing agent, a curing accelerator, a polymerization initiator, and the like. In the present specification, the curing agent means a compound having a functional group selected from a hydroxyl group, an amino group, a thiol group, an isocyanate group, a carboxyl group, and a carboxylic acid anhydride group, and the main agent means a compound having a functional group selected from the group consisting of a (meth)acryl group, an oxiranyl group, and an oxetanyl group.

The resin composition may contain only a main agent or contain a main agent and a curing agent.

[Main Agent: Resin Binder]

Examples of the main agent include various known epoxy resin monomers or acryl resin monomers. For example, it is possible to use the epoxy resin monomer and the acryl resin monomer described in "0028" in JP4118691B, the epoxy compound described in "0006" to "0011" in JP2008-13759A, the epoxy resin mixture described in "0032" to "0100" in JP2013-227451A, and the like. As the main agent, a liquid crystal compound which will be described later may also be used.

The content of the main agent in the resin composition with respect to the mass of total solid contents in the resin composition (mass of the solid contents except for a solvent) is preferably 10% by mass to 90% by mass, more preferably 20% by mass to 70% by mass, and even more preferably 30% by mass to 60% by mass.

(Liquid Crystal Compound)

As the main agent, a liquid crystal compound may also be used. The liquid crystal compound may be a rod-like liquid crystal compound or a disk-like liquid crystal compound.

—Rod-like Liquid Crystal Compound—

As the rod-like liquid crystal compound, azomethines, azoxies, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenylpyrimidines, phenyldioxanes, tolans, and alkenylcyclohexyl benzonitriles are preferably used. In addition to these low-molecular weight liquid crystal compounds, high-molecular weight liquid crystal compounds can also be used. The aforementioned high-molecular weight liquid crystal compounds are polymer compounds obtained by polymerizing rod-like liquid crystal compounds having a low-molecular weight reactive group. As rod-like liquid crystal compounds that are particularly preferably used, a rod-like liquid crystal compound represented by General Formula (XXI) can be exemplified.

$$Q^1\text{-}L^{111}\text{-}A^{111}\text{-}L^{113}\text{-}M\text{-}L^{114}\text{-}A^{112}\text{-}L^{112}\text{-}Q^2 \quad \text{General Formula (XXI):}$$

In the formula, $Q^1$ and $Q^2$ each independently represent a polymerizable group, and $L^{111}$, $L^{112}$, $L^{113}$, and $L^{114}$ each independently represent a single bond or a divalent linking group. $A^{111}$ and $A^{112}$ each independently represent a spacer group having 2 to 20 carbon atoms. M represents a mesogenic group.

At least one of $Q^1$ and $Q^2$ preferably represents an oxiranyl group, and both of $Q^1$ and $Q^2$ more preferably represent an oxiranyl group.

As the divalent linking group represented by $L^{111}$, $L^{112}$, $L^{113}$, and $L^{114}$, a divalent linking group is preferable which is selected from the group consisting of —O—, —S—, —CO—, —$NR^{112}$—, —CO—O—, —O—CO—O—, —CO—$NR^{112}$—, —$NR^{112}$—CO—, —O—CO—, —O—CO—$NR^{112}$—, —$NR^{112}$—CO—O—, and $NR^{112}$—CO—$NR^{112}$—. $R^{112}$ is an alkyl group having 1 to 7 carbon atoms or a hydrogen atom. In Formula (XXI), $Q^1$-$L^{111}$ and $Q^2$-$L^{112}$- preferably each represent $CH_2$=CH—CO—O—, $CH_2$=C($CH_3$)—CO—O—, or $CH_2$=C(Cl)—CO—O—CO—O—, and most preferably each represent $CH_2$=CH—CO—O—.

$A^{111}$ and $A^{112}$ each represent a spacer group having 2 to 20 carbon atoms. $A^{111}$ and $A^{112}$ preferably each represent an alkylene group having 2 to 12 carbon atoms, an alkenylene group, or an alkynylene group, and particularly preferably each represent an alkylene group. The spacer group is preferably in the form of a chain, and may include oxygen atoms or sulfur atoms that are not adjacent to each other. Furthermore, the spacer group may have a substituent, and may be substituted with a halogen atom (fluorine, chlorine, or bromine), a cyano group, a methyl group, or an ethyl group.

Examples of the mesogenic group represented by M include all the known mesogenic groups. Particularly, a group represented by General Formula (XXII) is preferable.

$$\text{-}(\text{-}W^1\text{-}L^{115})_n\text{-}W^2\text{-} \quad \text{General Formula (XXII):}$$

In the formula, $W^1$ and $W^2$ each independently represent a divalent cyclic alkylene or cyclic alkenylene group, a divalent aryl group, or a divalent heterocyclic group, $L^{115}$ represents a single bond or a linking group. Specific examples of the linking group include the specific examples of the groups represented by $L^{111}$ to $L^{114}$ in Formula (I), —$CH_2$—O—, and —O—$CH_2$—. n represents 1, 2, or 3.

Examples of $W^1$ and $W^2$ include 1,4-cyclohexanediyl, 1,4-phenylene, pyrimidine-2,5-diyl, pyridine-2,5-diyl, 1,3,4-thiadiazole-2,5-diyl, 1,3,4-oxadiaole-2,5-diyl, naphthalene-2,6-diyl, naphthalene-1,5-diyl, thiophene-2,5-diyl, and pyridazine-3,6-diyl. In a case where $W^1$ and $W^2$ represent 1,4-cyclohexanediyl, there may be constitutional isomers of a trans-isomer and a cis-isomer. Any of these isomers may be adopted, or a mixture in which the isomers are mixed at any ratio may be adopted. The isomer is more preferably a trans-isomer. Each of $W^1$ and $W^2$ may have a substituent. Examples of the substituent include a halogen atom (fluorine, chlorine, bromine, or iodine), a cyano group, an alkyl group having 1 to 10 carbon atoms (a methyl group, an ethyl group, a propyl group, or the like), an alkoxy group having 1 to 10 carbon atoms (a methoxy group, an ethoxy group, or the like), an acyl group having 1 to 10 carbon atoms (a formyl group, an acetyl group, or the like), an alkoxycarbonyl group having 1 to 10 carbon atoms (a methoxycarbonyl group, an ethoxycarbonyl group, or the like), an acyloxy group having 1 to 10 carbon atoms (an acetyloxy group, a propionyloxy group, or the like), a nitro group, a trifluoromethyl group, a difluoromethyl group, and the like.

Examples of those preferred as the basic skeleton of the mesogenic group represented by General Formula (XXII) described above will be shown below, and these may be substituted with the aforementioned substituent.

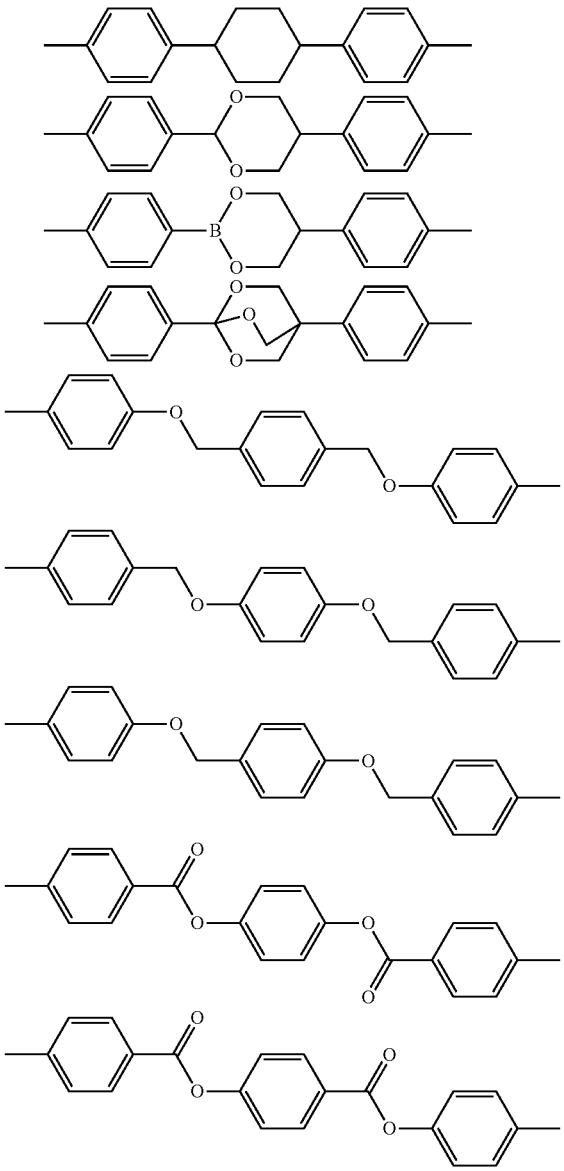

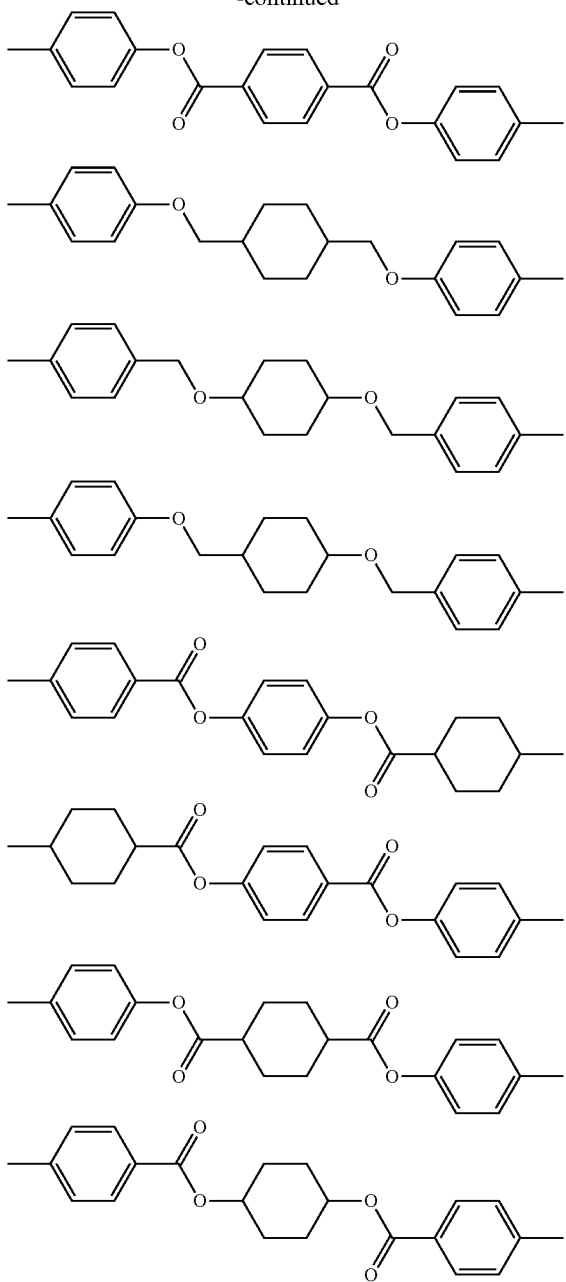

The compound represented by General Formula (XXI) can be synthesized with reference to the method described in JP1999-513019A (JP-H11-513019A) (WO97/00600).

The rod-like liquid crystal compound may be a monomer having the mesogenic group described in JP1999-323162A (JP-H11-323162A) and JP4118691B.

—Disk-like Liquid Crystal Compound—

The disk-like liquid crystal compound has a disk-like structure in at least a portion thereof. The disk-like structure refers to a compound which has at least an aromatic ring and can form a columnar structure by forming a stacking structure based on the intermolecular π-π interaction. Specific examples of the disk-like structure include the triphenylene structure described in Angew. Chem. Int. Ed. 2012, 51, 7990-7993 or JP1995-306317A (JP-H07-306317A), the tri-substituted benzene structure described in JP2007-2220A or JP2010-244038A, and the like.

It is also preferable that the resin composition of the present invention contains a compound which has the aforementioned disk-like structure but does not exhibit liquid crystallinity.

The inventor of the present invention has found that the compound having a disk-like structure brings about high thermal conductivity. Regarding such high thermal conductivity, the inventor does not stick to a specific theory but considers that while the rod-like compound can only linearly (one-dimensionally) conduct heat, the disk-like compound can flatwise (two-dimensionally) conduct heat in a normal direction, and accordingly, the number of heat conduction paths increase, and the thermal conductivity is improved.

Furthermore, by the addition of the compound having a disk-like structure, the heat resistance of a cured substance of the resin composition can be improved. In order to improve the heat resistance, it is more preferable that the compound having a disk-like structure have three or more functional groups.

It is preferable that disk-like liquid crystal compound has three or more functional groups. The cured substance of the resin composition containing a monomer having three or more functional groups tends to have a high glass transition temperature and high heat resistance. Compared to a compound having a rod-like structure, the disk-like compound more likely to have three or more functional groups without affecting the characteristics of a mesogenic portion. The number of functional groups in the disk-like compound is preferably equal to or smaller than 8, and more preferably equal to or smaller than 6. It is preferable that all the functional groups are oxiranyl groups.

As the disk-like compound, it is preferable to use a compound represented by General Formula (XI) or a compound represented by General Formula (XII) shown below.

General Formula XI

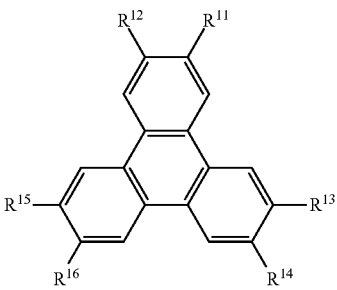

In the formula, $R^{11}$, $R^{12}$, $R^{13}$, $R^{14}$, $R^{15}$, and $R^{16}$ each independently represent *-$X^{11}$-$L^{11}$-$P^{11}$ or *-$X^{12}$—$Y^{12}$, * represents a position bonded to a triphenylene ring, two or more among $R^{11}$, $R^{12}$, $R^{13}$, $R^{14}$, $R^{15}$, and $R^{16}$ represent *-$X^{11}$-$L^{11}$-$P^{11}$, $X^{11}$ and $X^{12}$ each independently represent a single bond, —O—, —C(=O)—, —OC(=O)—, —OC(=O)O—, —OC(=O)NH—, —OC(=O)S—, —C(=O)O—, —C(=O)NH—, —C(=O)S—, —NHC(=O)—, —NHC(=O)O—, —NHC(=O)NH—, —NHC(=O)S—, —S—, —SC(=O)—, —SC(=O)O—, —SC(=O)NH—, or —SC(=O)S—, $L^{11}$ represents a divalent linking group or a single bond, $P^{11}$ represents a substituent selected from the group consisting of a (meth)acryl group, an oxiranyl group, an oxetanyl group, a hydroxyl group, an amino group, a thiol group, an isocyanate group, a carboxyl group, and a carboxylic acid anhydride group, $Y^{12}$ represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—.

It is preferable that three or more out of $R^{11}$, $R^{12}$, $R^{13}$, $R^{14}$, $R^{15}$, and $R^{16}$ represent *-$X^{11}$-$L^{11}$-$P^{11}$. Particularly, it is preferable that any one or more out of $R^{11}$ and $R^{12}$, any one or more out of $R^{13}$ and $R^{14}$, and any one or more out of $R^{15}$ and $R^{16}$ represent *-$X^{11}$-$L^{11}$-$P^{11}$. It is more preferable that all of $R^{11}$, $R^{12}$, $R^{13}$, $R^{14}$, $R^{15}$, and $R^{16}$ represent *-$X^{11}$-$L^{11}$-$P^{11}$. It is particularly preferable that all of $R^{11}$, $R^{12}$, $R^{13}$, $R^{14}$, $R^{15}$, and $R^{16}$ are the same as each other.

$X^{11}$ and $X^{12}$ each independently preferably represent —O—, —OC(=O)—, —OC(=O)O—, —OC(=O)NH—, —C(=O)O—, —C(=O)NH—, —NHC(=O)—, or NHC(=O)O—, more preferably represent —OC(=O)—, —C(=O)O—, —OC(=O)NH—, or C(=O)NH—, and particularly preferably represent —C(=O)O—.

$L^{11}$ represents a divalent linking group or a single bond linking $X^{11}$ and $P^{11}$ to each other. Examples of the divalent linking group include —O—, —OC(=O)—, —C(=O)O—, an alkylene group having 1 to 10 carbon atoms (preferably 1 to 8 carbon atoms and more preferably 1 to 6 carbon atoms), an arylene group having 6 to 20 carbon atoms (preferably 6 to 14 carbon atoms and more preferably 6 to 10 carbon atoms), a group obtained by combining these, and the like. Examples of the alkylene group having 1 to 10 carbon atoms include a methylene group, an ethylene group, a propylene group, a butylene group, a pentylene group, a hexylene group, and the like. Among these, a methylene group, an ethylene group, a propylene group, and a butylene group are preferable. Examples of the arylene group having 6 to 20 carbon atoms include a 1,4-phenylene group, a 1,3-phenylene group, a 1,4-naphthylene group, a 1,5-naphthylene group, an anthracenylene group, and the like. Among these, a 1,4-phenylene group is preferable.

Each of the alkylene group and the arylene group may have a substituent. The substituent includes substituents shown in a substituent group Y, which will be described later, an alkyl group, and an alkenyl group. The number of substituents is preferably 1 to 3, and more preferably 1. The substitution position is not particularly limited. As the substituent, a halogen atom or an alkyl group having 1 to 3 carbon atoms is preferable, and a methyl group is more preferable. It is also preferable that the alkylene group and the arylene group are unsubstituted. Particularly, it is preferable that the alkylene group is unsubstituted.

$P^{11}$ represents a functional group selected from the group consisting of a (meth)acryl group, an oxiranyl group, an oxetanyl group, a hydroxyl group, an amino group, a thiol group, an isocyanate group, a carboxyl group, and a carboxylic acid anhydride group. It is preferable that $P^{11}$ represents an oxiranyl group.

In a case where $P^{11}$ represents a hydroxyl group, $L^{11}$ includes an arylene group, and it is preferable that arylene group is bonded to $P^{11}$.

$Y^{12}$ represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—. In a case where $Y^{12}$ represents a linear, branched, or cyclic alkyl group having 1 to 20 carbon atoms or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—, $Y^{12}$ may be substituted with a halogen atom. Examples of the linear or branched alkyl group having 1 to 20 carbon atoms include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a 1,1-dimethylpropyl group, a n-hexyl group, an isohexyl group, a linear or branched heptyl group, an octyl group, a nonyl group, a decyl group, an undecyl group, and a dodecyl group. The number of carbon atoms in the cyclic alkyl group is preferably 3 to 20, and more preferably equal to or greater than 5. The number of carbon atoms in the cyclic alkyl group is preferably equal to or smaller than 10, more preferably equal to or smaller than 8, and even more preferably equal to or smaller than 6. Examples of the cyclic alkyl group include a cyclopropyl group, a cyclobutyl group, a cyclopentyl group, a cyclohexyl group, a cycloheptyl group, and a cyclooctyl group.

$Y^{12}$ is preferably a hydrogen atom, a linear, branched, or cyclic alkyl group having 1 to 20 carbon atoms, or an alkylene oxide group having 1 to 20 carbon atoms, and more preferably a linear or branched alkyl group having 1 to 12 carbon atoms or an ethylene oxide group or propylene oxide group having 1 to 20 carbon atoms.

Regarding specific examples of the compound represented by General Formula (XI) shown above, those described in paragraphs "0028" to "0036" in JP1995-281028A (JP-H07-281028A), JP1995-306317A (JP-H07-306317A), paragraphs "0016" to "0018" in JP2005-156822A, paragraphs "0067" to "0072" in JP2006-301614A, and Liquid Crystal Handbook (published on 2000 from MARUZEN Co., Ltd.), pp. 330 to 333.

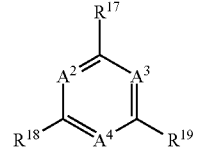

General Formula (XII)

In the formula, $A^2$, $A^3$, and $A^4$ each independently represent —CH= or —N=, $R^{17}$, $R^{18}$, and $R^{19}$ each independently represent *-$X^{211}$-($Z^{21}$—$X^{212}$)$_{n21}$-$L^{21}$-$P^{21}$ or *-$X^{211}$-($Z^{22}$-$X^{222}$)$_{n22}$-$Y^{22}$, * represents a position bonded to a central ring, two or more among $R^{17}$, $R^{18}$, and $R^{19}$ represent *-$X^{211}$-($Z^{21}$-$X^{212}$)$_{n21}$-$L^{21}$-$P^{21}$, $X^{211}$ and $X^{212}$ each independently represent a single bond, —O—, —C(=O)—, —OC(=O)—, —OC(=O)O—, —OC(=O)NH—, —OC(=O)S—, —C(=O)O—, —C(=O)NH—, —C(=O)S—, —NHC(=O)—, —NHC(=O)O—, —NHC(=O)NH—, —NHC(=O)S—, —S—, —SC(=O)—, —SC(=O)O—, —SC(=O)NH—, or SC(=O)S—, $Z^{21}$ and $Z^{22}$ each independently represent an aromatic group as a 5-membered or 6-membered ring or a non-aromatic group as a 5-membered or 6-membered ring, $L^{21}$ represents a divalent linking group or a single bond linking $X^{212}$ and $P^{21}$ to each other, $P^{21}$ represents a substituent selected from the group consisting of a (meth)acryl group, an oxiranyl group, an oxetanyl group, a hydroxyl group, an amino group, a thiol group, an isocyanate group, a carboxyl group, and a carboxylic acid anhydride group, $Y^{22}$ represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—, n$^{21}$ and n$^{22}$ each independently represent an integer of 0 to 3, and in a case where each of n$^{21}$ and n$^{22}$ is equal to or greater than 2, a plurality of groups represented by Z$^{21}$-X$^{212}$ and Z$^{22}$-X$^{222}$ may be the same as or different from each other.

It is preferable that all of R$^{17}$, R$^{18}$, and R$^{19}$ represent *-X$^{211}$-(Z21-X$^{212}$)$_{n21}$-L$^{21}$-P$^{21}$. It is more preferable that all of R$^{17}$, R$^{18}$, and R$^{19}$ are the same as each other.

As X$^{211}$, X$^{212}$, X$^{221}$, and X$^{222}$, a single bond and —OC(=O)— are preferable.

Z$^{21}$ and Z$^{22}$ each independently represent an aromatic group as a 5-membered or 6-membered ring or a non-aromatic group as a 5-membered or 6-membered ring. Examples thereof include a 1,4-phenylene group, a 1,3-phenylene group, a heterocyclic group, and the like.

The aromatic group and the non-aromatic group described above may have a substituent. The substituent includes substituents shown in the substituent group Y, which will be described later, an alkyl group, and an alkenyl group. The number of substituents is preferably 1 or 2, and more preferably 1. The substitution position is not particularly limited. As the substituent, a halogen atom or a methyl group is preferable. As the halogen atom, a chlorine atom or a fluorine atom is preferable. It is also preferable that the aromatic group and the non-aromatic group are unsubstituted.

Examples of the heterocyclic ring include the following heterocyclic rings.

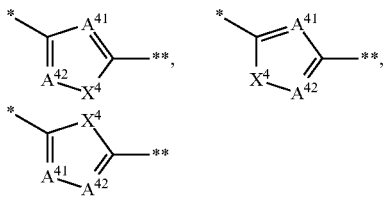

In the formulae, * represents a portion bonded to X$^{211}$, ** represents a portion bonded to X$^{212}$; A$^{41}$ and A$^{42}$ each independently represent methine or a nitrogen atom; and X$^{4}$ represents an oxygen atom, a sulfur atom, methylene, or imino.

It is preferable that at least one of A$^{41}$ and A$^{42}$ represents a nitrogen atom. It is more preferable that both of A$^{41}$ and A$^{42}$ represent a nitrogen atom. Furthermore, it is preferable that X$^{4}$ represents an oxygen atom.

L$^{21}$ each independently represents a divalent linking group or a single bond linking X$^{212}$ and P$^{21}$ to each other, and has the same definition as L$^{11}$ in General Formula (XI). As L$^{21}$, —O—, —OC(=O)—, —C(=O)O—, an alkylene group having 1 to 10 carbon atoms (preferably 1 to 8 carbon atoms and more preferably 1 to 6 carbon atoms), or a group obtained by combining these is preferable.

P$^{21}$ each independently represents a functional group, and has the same definition as P$^{11}$ in General Formula (XI). The preferred range of P$^{21}$ is the same as the preferred range of P$^{11}$ in General Formula (XI).

Y$^{22}$ each independently represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—. Y$^{22}$ has the same definition as Y$^{12}$ in General Formula (XI), and the preferred range thereof is also the same as the preferred range of Y$^{12}$ in General Formula (XI).

n$^{21}$ and n$^{22}$ each independently represent an integer of 0 to 3. n$^{21}$ and n$^{22}$ each independently preferably represent an integer of 1 to 3, and more preferably represent 2 or 3.

Regarding the details and specific examples of the compound represented by General Formula (XII), the description in paragraphs "0013" to "0077" in JP2010-244038A can be referred to, and the contents thereof are incorporated into the present specification.

It is preferable that the compound represented by General Formula (XI) or (XII) is a compound having a hydrogen bonding functional group, because then the stacking is enhanced by reducing the electron density, and hence a columnar aggregate is easily formed. Examples of the hydrogen bonding functional group include —OC(=O)NH—, —C(=O)NH—, —NHC(=O)—, —NHC(=O)O—, —NHC(=O)NH—, —NHC(=O)S—, —SC(=O)NH—, and the like.

Specific examples of compounds particularly preferred as the compound represented by General Formula (XI) and the compound represented by General Formula (XII) include the following compounds.

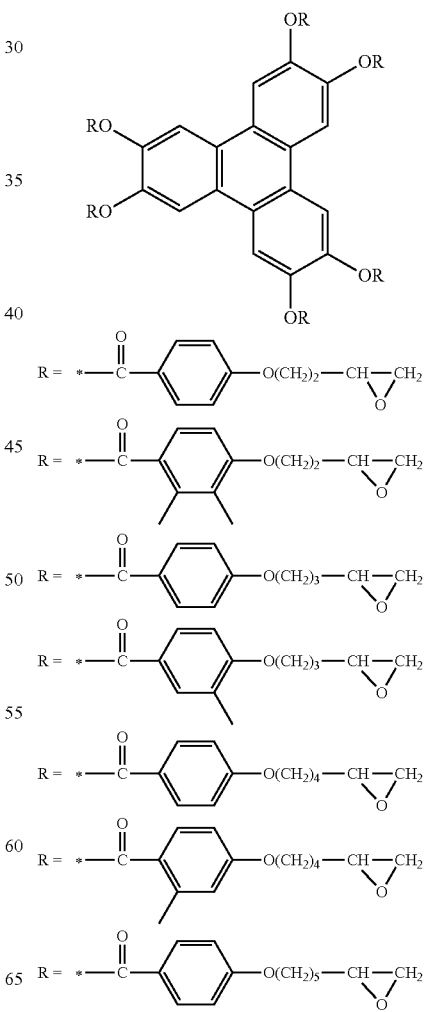

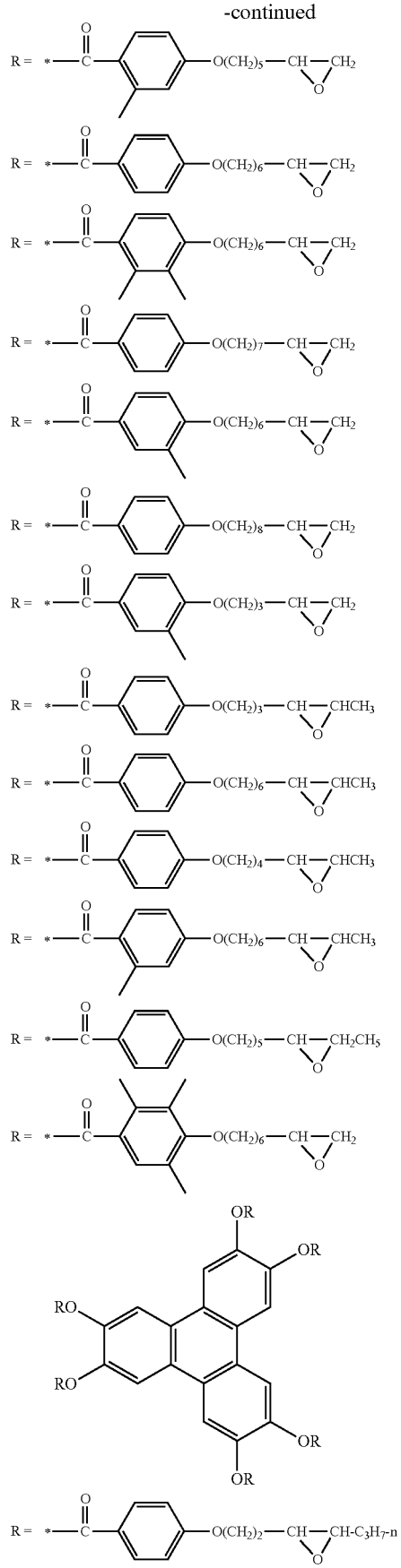
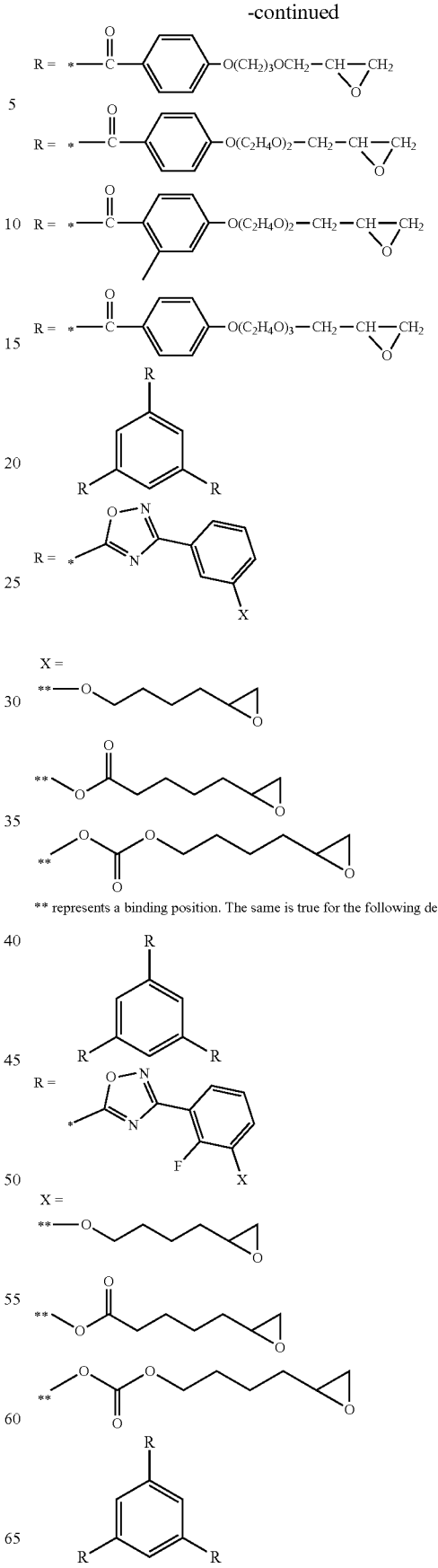
** represents a binding position. The same is true for the following description.

27
-continued
R =
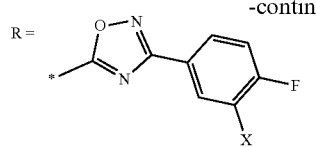
X =
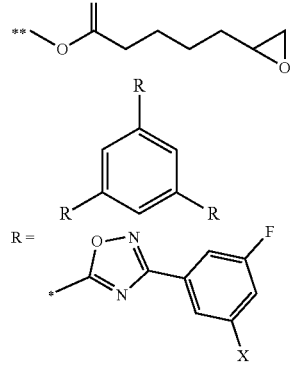
R =
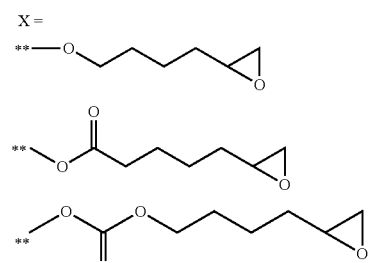
X =
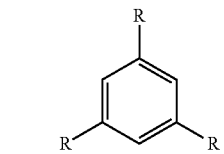
R =
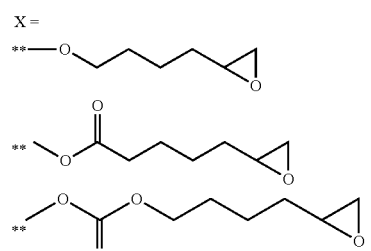
X =
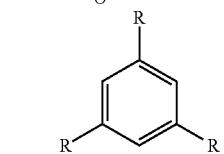
28
-continued
R =
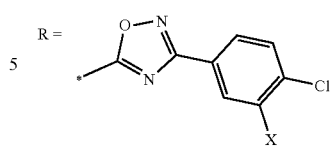
X =
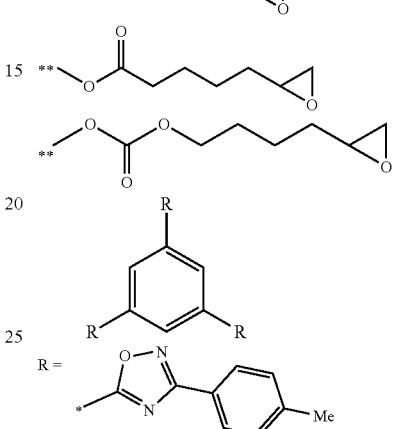
R =
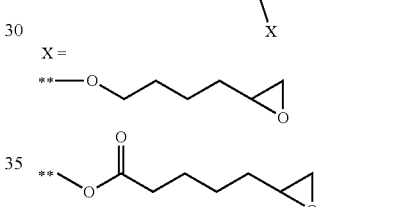
X =
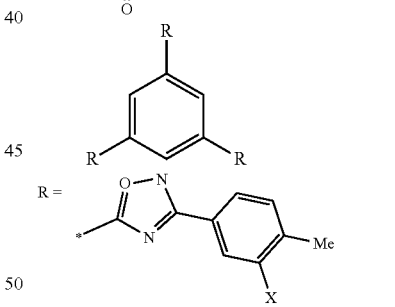
R =
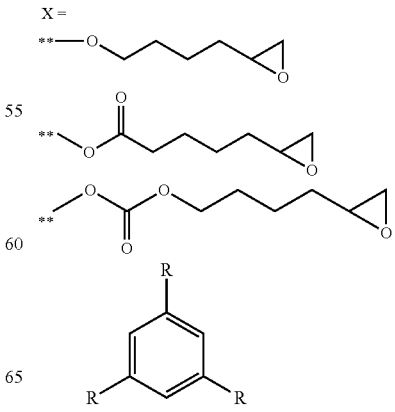

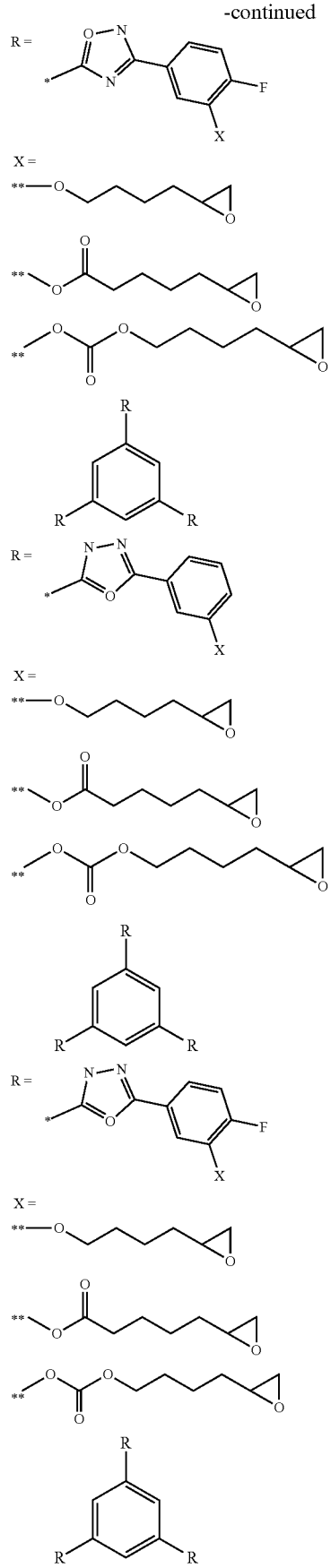
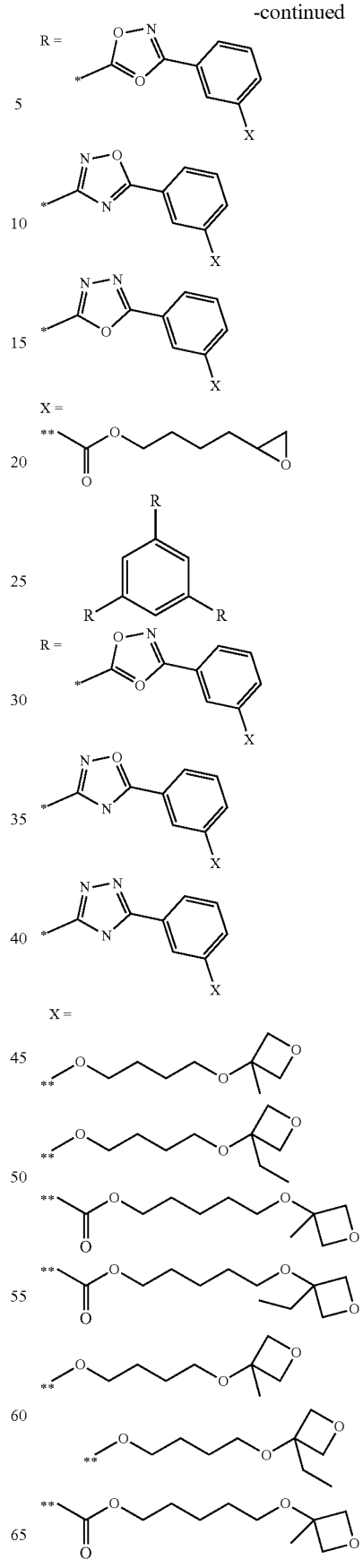

31
-continued
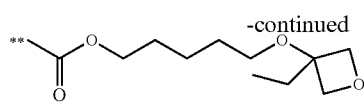
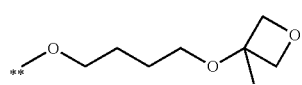
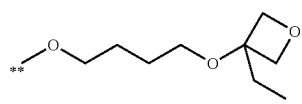
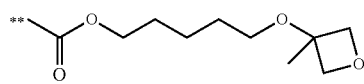
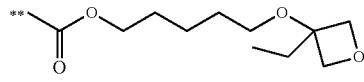
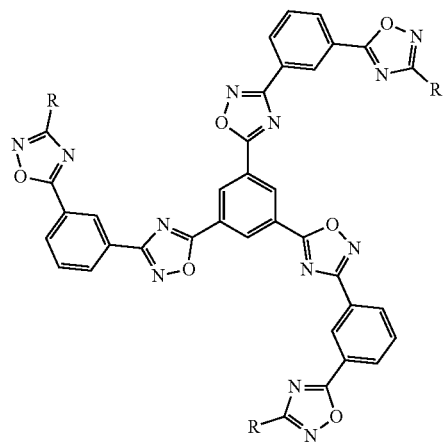
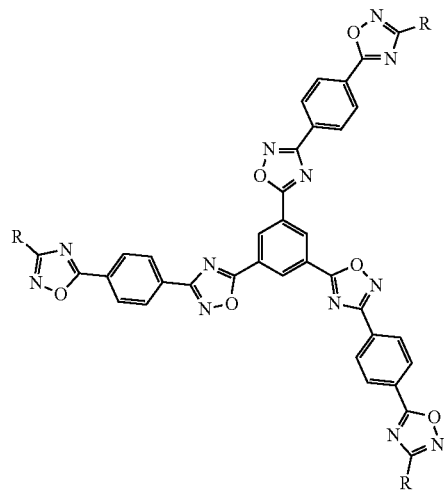
32
-continued
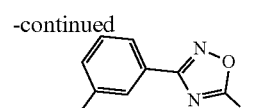
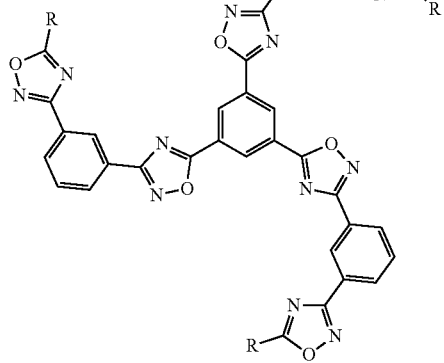
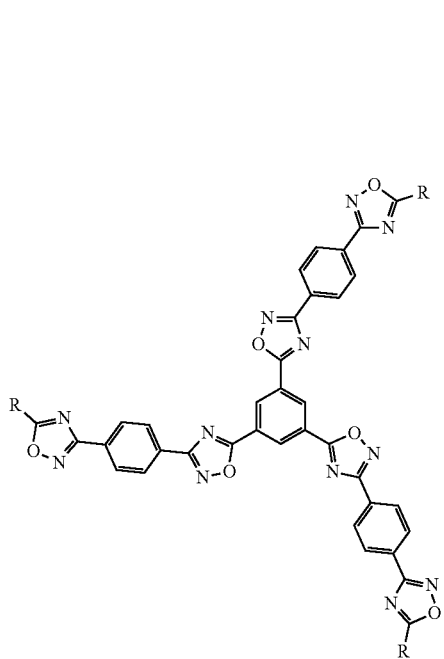
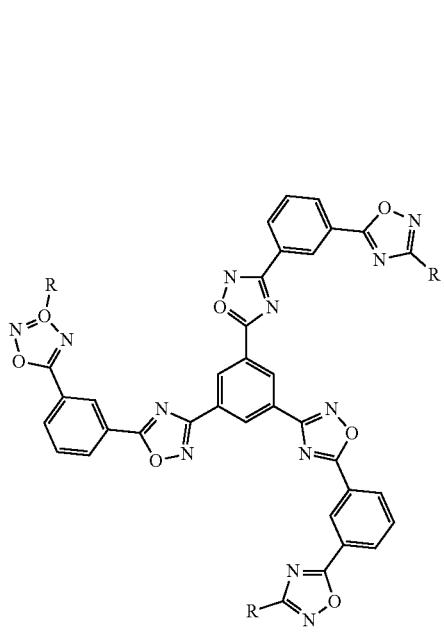

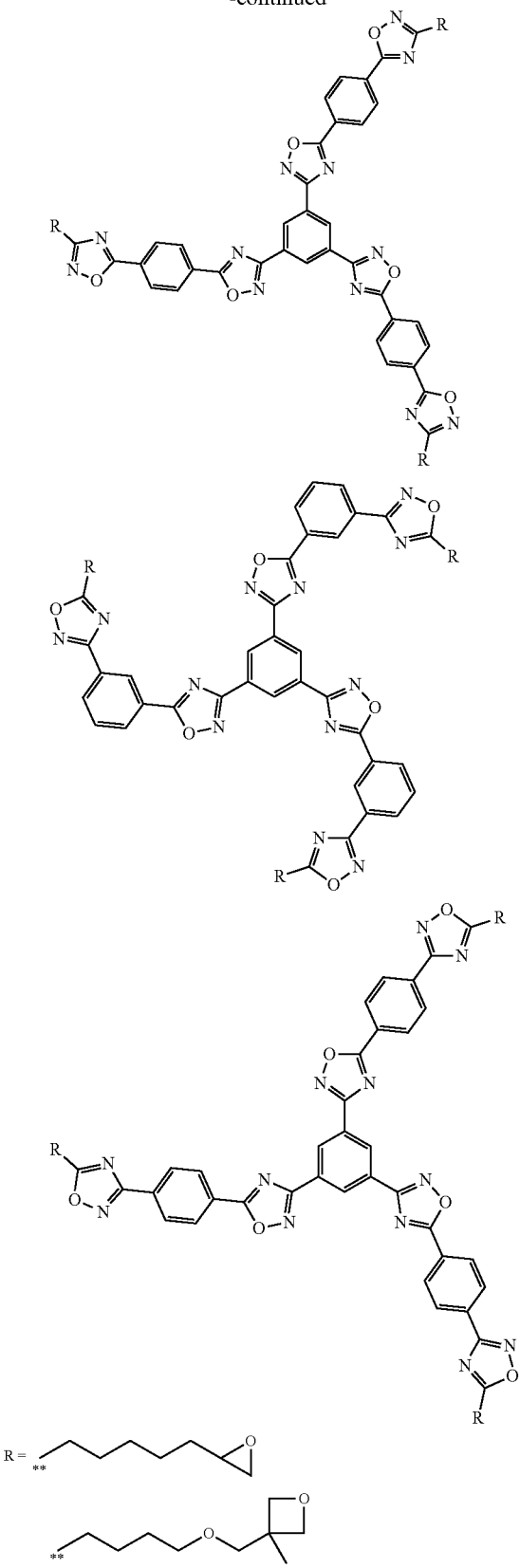

The compound represented by General Formula (XI) can be synthesized based on the methods described in JP1995-306317A (JP-H07-306317A), JP1995-281028A (JP-H07-281028A), JP2005-156822A, and JP2006-301614A.

The compound represented by General Formula (XII) can be synthesized based on the methods described in JP2010-244038A, JP2006-76992A, and JP2007-2220A.

[Curing Agent]

The resin composition may contain a curing agent.

The curing agent is not particularly limited as long as it is a compound having a functional group selected from the group consisting of a hydroxyl group, an amino group, a thiol group, an isocyanate group, a carboxyl group, and a carboxylic acid anhydride group. It is preferable that the curing agent has a functional group selected from the group consisting of a hydroxyl group, an amino group, and a thiol group. The curing agent preferably has two or more functional groups described above and more preferably has two functional groups described above.

Examples of the curing agent include the curing agent for an epoxy resin described in "0028" in JP4118691B, the amine-based curing agent, the phenol-based curing agent, or the acid anhydride-based curing agent described in "0016" to "0018" in JP2008-13759A, the amine-based curing agent and the phenol-based curing agent described in "0101" to "0150" in JP2013-227451A, and the like.

Among these, the amine-based curing agent is particularly preferable, and examples of compounds preferred as the amine-based curing agent include 4,4'-diaminodiphenylmethane, 4,4'-diaminodiphenylether, 4,4'-diaminodiphenylsulfone, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, and the like.

The content of the curing agent in the resin composition with respect to the mass of total solid content in the resin composition (the mass of the total solid content except for a solvent) is preferably 90% by mass to 10% by mass, and more preferably 80% by mass to 30% by mass.

[Curing Accelerator]

The resin composition may contain a curing accelerator. Examples of the curing accelerator include triphenylphosphine, 2-ethyl-4-methylimidazole, a boron trifluoride amine complex, 1-benzyl-2-methylimidazole, and those described in paragraph "0052" in JP2012-67225A.

[Polymerization Initiator]

Particularly, in a case where the resin composition contains a disk-like compound having a (meth)acryl group as a functional group or another main agent having a (meth)acryl group, it is also preferable that the resin composition contains the polymerization initiator described in paragraph "0062" in JP2010-125782A and paragraph "0054" in JP2015-052710A.

The content of the curing accelerator and the polymerization initiator in the resin composition with respect to the mass of total solid content in the resin composition (the mass of the total solid content except for a solvent) is preferably 20% by mass to 0.1% by mass, and more preferably 10% by mass to 1% by mass.

[Solvent]

The resin composition may be prepared as a solution.

The solvent of the aforementioned solution is not particularly limited, but is preferably an organic solvent. Examples of the organic solvent include ethyl acetate, methyl ethyl ketone (MEK), dichloromethane, tetrahydrofuran (THF), and the like.

<Use of Surface-modified Inorganic Substance>

The surface-modified inorganic substance of the present invention can be applied as it is or in the form of the aforementioned resin composition to various fields as a pigment, a catalyst, an electrode material, a semiconductor material, a heat dissipation material, a thermally conductive material, a lubricant, and the like. It is particularly preferable that the surface-modified inorganic substance of the present invention is used for forming a thermally conductive material and a lubricant.

[Thermally Conductive Material]

The thermally conductive material is a material having thermal conductivity. The thermally conductive material can be used as a heat dissipation material such as a heat dissipation sheet, and can be used for dissipating heat from various devices such as power semiconductor devices.

The shape of the thermally conductive material is not particularly limited, and can be molded to have various shapes according to the use. Typically, the thermally conductive material is preferably in the form of a film or sheet.

The thermally conductive material of the present invention includes a cured substance of a resin composition containing a surface-modified inorganic substance and a resin binder. The cured substance can be prepared by a curing reaction of the resin composition. The curing may be a thermal curing reaction or a photocuring reaction, and the curing reaction may be selected according to the functional group of the monomer in the resin composition. Generally, a thermal curing reaction is preferable as curing. The heating temperature at the time of the curing is not particularly limited. For example, the heating temperature may be appropriately selected within a range of 50° C. to 200° C. and preferably within a range of 60° C. to 150° C.

It is preferable that the curing is performed on the resin composition formed into a film or sheet. Specifically, the resin composition may be formed into a film by coating and subjected to a curing reaction. At this time, press working may also be performed.

The curing may be semi-curing. Furthermore, the thermally conductive material may be disposed in a device to be used or the like by being brought into contact with the device, and then permanently cured by being further cured through heating or the like. It is also preferable to allow the device and the thermally conductive material of the present invention to stick to each other through the heating or the like that is performed for the permanent curing described above.

Regarding the preparation of the thermally conductive material including the curing reaction, "Highly Thermally Conductive Composite Material" (CMC Publishing CO., LTD., Yoshitaka Takezawa) can be referred to.

[Lubricant]

The surface-modified inorganic substance obtained as above can be used for preparing a lubricant. The lubricant can be prepared in a manner in which the surface-modified inorganic substance is mixed with, dispersed in, or kneaded with grease (a low-molecular weight monomer or a polymer resin) or the like. As the grease, those known in the related art may be used. For preparing the lubricant, it is particularly preferable to use a surface-modified inorganic substance containing boron nitride as an inorganic substance, because particularly boron nitride itself is known to exhibit lubricating properties in a high temperature region.

EXAMPLES

Hereinafter, the present invention will be more specifically described based on examples. The materials and reagents, the amounts of substances and a ratio therebetween, the operation, and the like described in the following examples can be appropriately changed within a range that does not depart from the gist of the present invention. Accordingly, the scope of the present invention is not limited to the following examples.

<Establishment of Experimental System>

Alizarin is a compound which is well known to modify the surface of zinc oxide by being bonded to zinc oxide (JP5479175B). 12 mg of alizarin (manufactured by Wako Pure Chemical Industries, Ltd., catalog No. 015-01151) was dissolved in 300 mL of methyl ethyl ketone. By using a visible absorption spectrum (UV-3100PC manufactured by Shimadzu Corporation) of the solution, the absorbance at a wavelength of 427 nm was measured. Furthermore, 25 mL of the solution was added to separately prepared fine zinc oxide particles (manufactured by Wako Pure Chemical Industries, Ltd., 264-00365) and gently stirred. After about 5 minutes, the supernatant solution of the solution was filtered using a 0.45 μm filter (Minisart RC15 manufactured by Sartorius). For the solution obtained after filtration using the filter, the absorbance was measured in the same manner as described above. As a result, the absorbance of the solution increased by 27.6% after the addition of zinc oxide than before the addition of zinc oxide. FIG. 1 shows the measured absorption spectra of the both solutions. From the obtained result, it was understood that, by comparing the absorbances as described above, from the decrement of the absorbance, it is possible to determine whether or not the surface of an inorganic substance is modified with a compound and to determine the degree of surface modification.

(Testing Adsorption Onto Inorganic Nitride)

Figure 2:
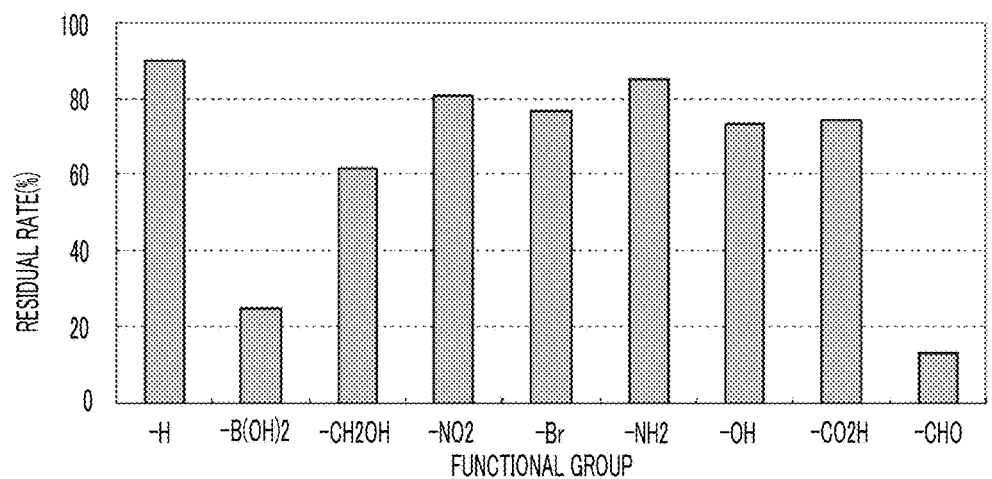
FIG. 2 is a graph showing how the maximum absorbance changes at a specific wavelength after boron nitride is added to various derivatives of pyrene through comparison.

5.0 mg of a pyrene compound having the following structure was dissolved in 300 mL of dichloromethane, 25 mL of the solution was added to 500 mg of boron nitride (BORONID Cooling Filer Platelate 001 manufactured by 3M), and the solution was gently stirred with a stirring rod. After about 5 minutes, the supernatant solution of each solution was filtered using a 0.45 μm filter (Minisart RC15 manufactured by Sartorius). For the solution obtained after filtration using the filter, the absorbance was measured using an ultraviolet-visible absorption spectrum (UV-3100PC manufactured by Shimadzu Corporation). The results are shown in FIG. 2. Furthermore, the absorbance of the dichloromethane solution of a pyrene compound, to which boron nitride was not added, at a specific maximum wavelength was regarded as being 100%, the absorbance of the aforementioned filtrate, which was obtained after the addition of boron nitride, at a specific wavelength was represented in %, and the absorbances were compared to each other. The results are shown in the following Table 1 and FIG. 2.

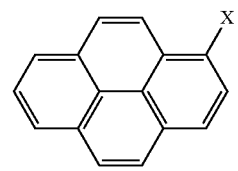

(X represents a substituent.)

TABLE 1

|  | Absorption wavelength (nm) | Absorbance before adsorption | Absorbance after adsorption | Residual rate (%) |
|---|---|---|---|---|
| Pyrene | 337 | 0.862 | 0.777 | 90.1 |
| 1-Pyrene boronic acid | 346 | 0.695 | 0.172 | 24.7 |
| 1-Pyrenemethanol | 344 | 0.730 | 0.452 | 61.9 |
| 1-Nitropyrene | 404 | 0.832 | 0.674 | 81.0 |
| 1-Bromopyrene | 346 | 0.960 | 0.733 | 76.4 |
| 1-Aminopyrene | 398 | 0.602 | 0.513 | 85.2 |
| 1-Hydroxypyrene | 383 | 0.280 | 0.206 | 73.6 |
| 1-Pyrene carboxylic acid | 396 | 1.102 | 0.822 | 74.6 |
| 1-Pyrene carboxyaldehyde | 385 | 0.161 | 0.021 | 13.0 |

As is evident from the results shown in the above table, in the example in which 1-pyrene carboxyaldehyde was used, compared to the absorbance before the addition of boron nitride, the absorbance at 385 nm was markedly reduced after the addition of boron nitride. The decrement resulted from the adsorption of the aldehyde compound onto the surface of boron nitride and the formation of a monolayer. It is understood that the adsorption rate is markedly higher than that of hydroxypyrene and other compounds having a phenolic hydroxyl group.

<Preparation of Cured Substance of Composition Containing Surface-modified Inorganic Substance>

<Formation of Self-supported Film by Using Resin Composition>

By mixing the materials in Table 2 together, a slurry was prepared. A 2.0 cm×2.5 cm PET film (COSMOSHINE, manufactured by Toyobo Co., Ltd., film thickness: 50 μm) was coated with 1 mL of the slurry by using a spin coater, thereby preparing a film having a uniform surface shape. The film was disposed on a hot plate, and the solvent was stepwise evaporated for 30 seconds at 60° C., 30 seconds at 80° C., and 30 seconds at 100° C. Thereafter, the film was heated for 30 seconds at 160° C., then cooled to room temperature, and peeled from the PET film, thereby a self-supported film having a thickness of about 400 μm.

The materials in Table 2 were prepared as below.

[Main Agent]
(Disk-like Liquid Crystal Compound 2)

According to the method described in examples in JP2696480B, a compound TP-85 was synthesized and used as a disk-like liquid crystal compound 2.

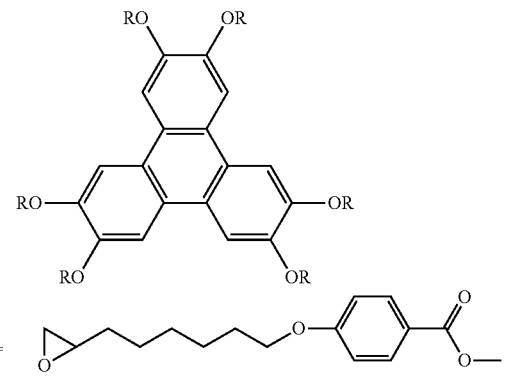

(Disk-like Liquid Crystal Compound 4)

According to the method described in examples in JP5385937B, a trihydroxy substance shown below was synthesized. The substance was alkylated based on the method described in examples in JP2696480B and then oxidized using mCPBA, thereby obtaining a disk-like liquid crystal compound 4 shown below.

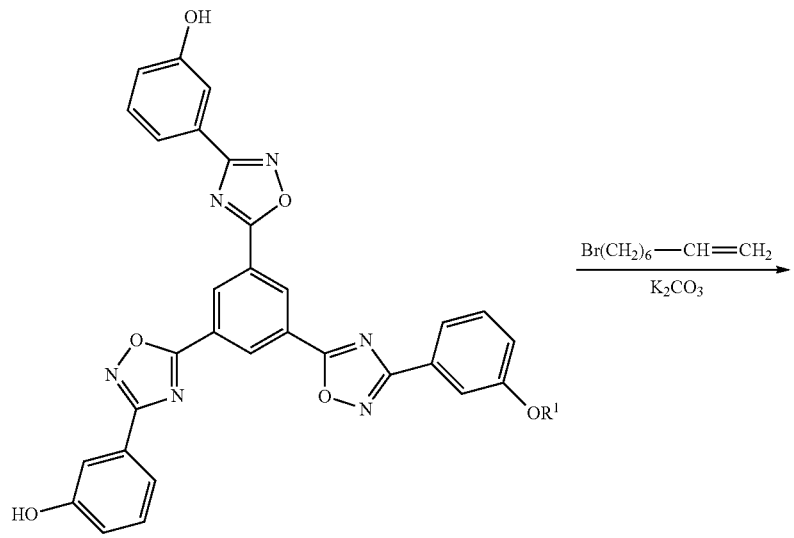

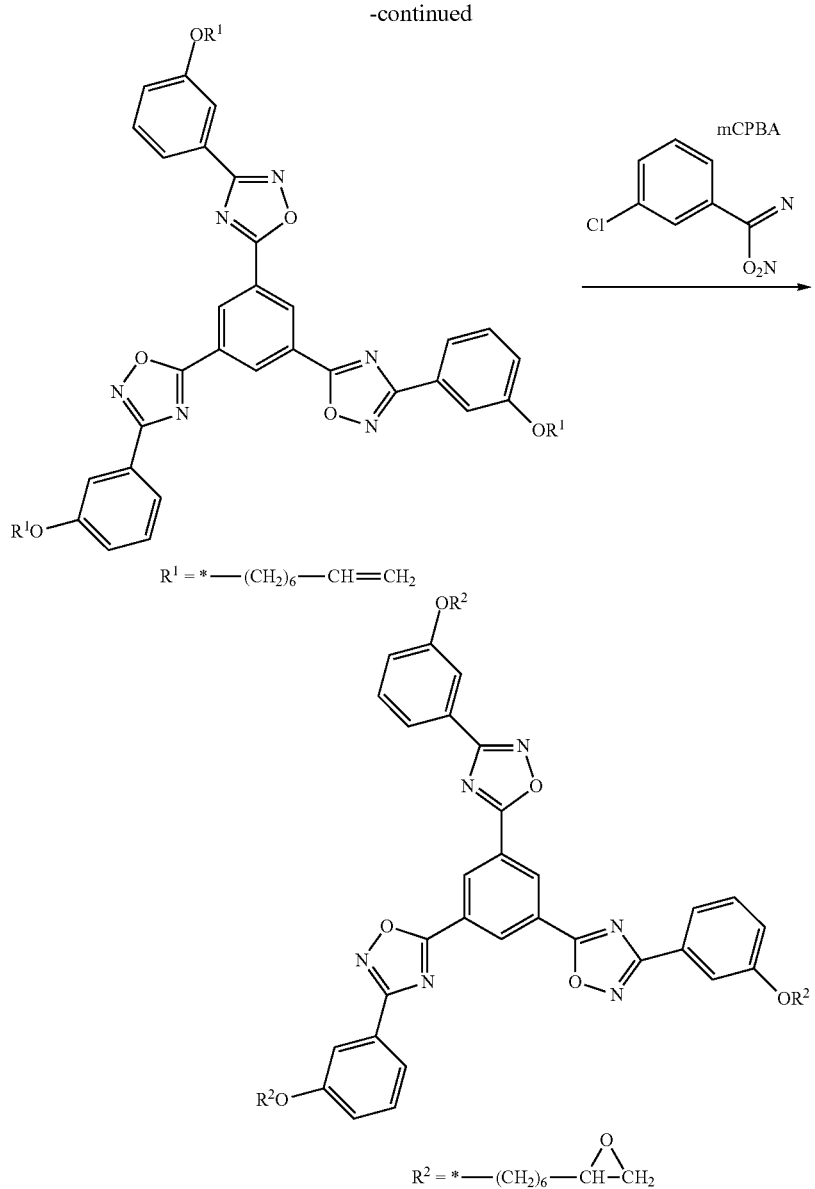

(Disk-like Liquid Crystal Compound 6)

According to the method described in Example 13 in JP5620129B, an intermediate shown below was synthesized. Then, the intermediate was reacted with epichlorohydrin, thereby synthesizing a disk-like liquid crystal compound 6.

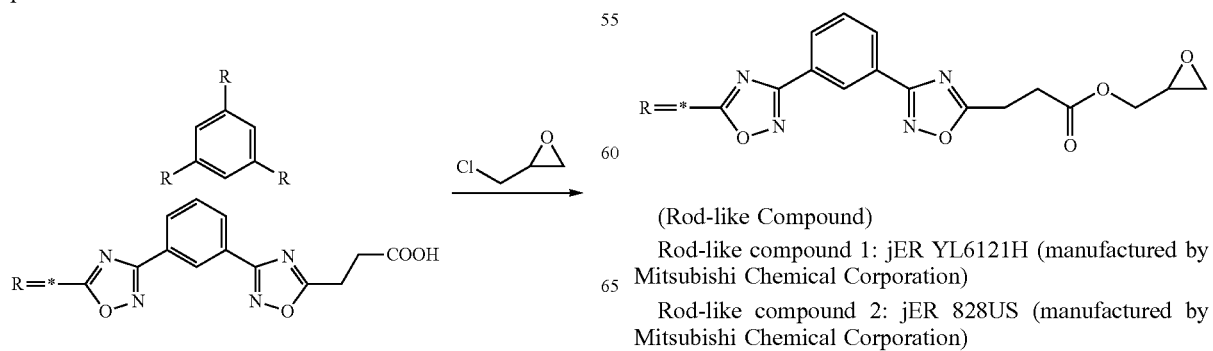

(Rod-like Compound)

Rod-like compound 1: jER YL6121H (manufactured by Mitsubishi Chemical Corporation)

Rod-like compound 2: jER 828US (manufactured by Mitsubishi Chemical Corporation)

(Curing Agent)

Curing agent 1: 1,5-naphthalenediamine (manufactured by TOKYO CHEMICAL INDUSTRY CO., LTD.)

Curing agent 2: 4,4'-diaminodiphenylmethane (manufactured by TOKYO CHEMICAL INDUSTRY CO., LTD.)

Curing agent 3: 4,4'-diaminodiphenylsulfone (manufactured by TOKYO CHEMICAL INDUSTRY CO., LTD.)

[Inorganic Nitride]

Boron nitride 1 (hereinafter, described as BN1): BORONID Cooling Filer AGGLOMERATE 50 (manufactured by 3M)

Boron nitride 2 (hereinafter, described as BN2): BORONID Cooling Filer AGGLOMERATE 100 (manufactured by 3M)

Boron nitride 3 (hereinafter, described as BN3): DENKA BORON NITRIDE FP70 (manufactured by Denka Company Limited.)

Alumina: AW70 (manufactured by Micron Co., Ltd.)

(Aldehyde Compound)

Aldehyde 1: p-hydroxybenzaldehyde (manufactured by Sigma-Aldrich Co. LLC.)

Aldehyde 2: p-aminobenzaldehyde (manufactured by TOKYO CHEMICAL INDUSTRY CO., LTD.)

[Measurement of Thermal Conductivity]

(1) By using "ai-Phase Mobile 1u" manufactured by ai-Phase Co., Ltd., a coefficient of thermal diffusivity in a thickness direction was measured.

(2) By using a balance "XS204" ("solid specific gravity measuring kit" is used) manufactured by METTLER TOLEDO, the specific gravity was measured.

(3) By using "DSC320/6200" manufactured by Seiko Instruments Inc. and software of DSC7, the specific heat at 25° C. was determined under the heating condition of 10° C./min.

(4) The obtained coefficient of thermal diffusivity was multiplied by the specific gravity and the specific heat, thereby calculating the thermal conductivity. The results are shown in Table 2.

TABLE 2

| | Main agent | g | Curing agent | g | Inorganic nitride | g | Surface modifier | g | Solvent | g | Thermal conductivity (W/m · K) |
|---|---|---|---|---|---|---|---|---|---|---|---|
| Example 1 | Disk-like liquid crystal compound 2 | 3 | Curing agent 1 | 2.5 | BN1 | 5 | Aldehyde 1 | 0.05 | MEK | 5 | 13.4 |
| Example 2 | Disk-like liquid crystal compound 2 | 3 | Curing agent 2 | 2.5 | BN1 | 5 | Aldehyde 1 | 0.05 | MEK | 5 | 13.2 |
| Example 3 | Disk-like liquid crystal compound 2 | 3 | Curing agent 3 | 2.5 | BN1 | 5 | Aldehyde 1 | 0.05 | MEK | 5 | 13.6 |
| Example 4 | Disk-like liquid crystal compound 2 | 3 | Curing agent 1 | 2.5 | BN1 (80) + Alumina (20) | 5 | Aldehyde 1 | 0.05 | MEK | 5 | 12.9 |
| Example 5 | Disk-like liquid crystal compound 2 | 3 | Curing agent 1 | 2.5 | BN2 | 5 | Aldehyde 1 | 0.05 | MEK | 5 | 12.6 |
| Example 6 | Disk-like liquid crystal compound 2 | 3 | Curing agent 1 | 2.5 | BN3 | 5 | Aldehyde 1 | 0.05 | MEK | 5 | 13.1 |
| Example 7 | Disk-like liquid crystal compound 2 | 3 | Curing agent 1 | 2.5 | BN1 | 5 | Aldehyde 2 | 0.05 | MEK | 5 | 14.4 |
| Example 8 | Disk-like liquid crystal compound 4 | 3 | Curing agent 1 | 2.5 | BN1 | 5 | Aldehyde 1 | 0.05 | MEK | 5 | 12.2 |
| Example 9 | Disk-like liquid crystal compound 4 | 3 | Curing agent 1 | 2.5 | BN1 | 5 | Aldehyde 2 | 0.05 | MEK | 5 | 12.1 |
| Example 10 | Disk-like liquid crystal compound 6 | 3 | Curing agent 1 | 2.5 | BN1 | 5 | Aldehyde 1 | 0.05 | MEK | 5 | 12.4 |
| Example 11 | Disk-like liquid crystal compound 6 | 3 | Curing agent 1 | 2.5 | BN1 | 5 | Aldehyde 2 | 0.05 | MEK | 5 | 13.2 |
| Example 12 | Rod-like compound 1 | 3 | Curing agent 1 | 2.5 | BN1 | 5 | Aldehyde 1 | 0.05 | MEK | 5 | 9.5 |
| Example 13 | Rod-like compound 2 | 3 | Curing agent 1 | 2.5 | BN1 | 5 | Aldehyde 1 | 0.05 | MEK | 5 | 9.1 |
| Comparative Example 1 | Disk-like liquid crystal compound 2 | 3 | Curing agent 1 | 2.5 | BN1 | 5 | N/A | 0.00 | MEK | 5 | 11.2 |
| Comparative Example 2 | Disk-like liquid crystal compound 2 | 3 | Curing agent 2 | 2.5 | BN1 | 5 | N/A | 0.00 | MEK | 5 | 10.9 |
| Comparative Example 3 | Disk-like liquid crystal compound 2 | 3 | Curing agent 3 | 2.5 | BN1 | 5 | N/A | 0.00 | MEK | 5 | 10.5 |
| Comparative Example 4 | Disk-like liquid crystal compound 2 | 3 | Curing agent 1 | 2.5 | BN1 (80) + Alumina (20) | 5 | N/A | 0.00 | MEK | 5 | 10.3 |
| Comparative Example 5 | Disk-like liquid crystal compound 2 | 3 | Curing agent 1 | 2.5 | BN2 | 5 | N/A | 0.00 | MEK | 5 | 9.8 |
| Comparative Example 6 | Disk-like liquid crystal compound 2 | 3 | Curing agent 1 | 2.5 | BN3 | 5 | N/A | 0.00 | MEK | 5 | 9.6 |
| Comparative Example 7 | Disk-like liquid crystal compound 4 | 3 | Curing agent 1 | 2.5 | BN1 | 5 | N/A | 0.00 | MEK | 5 | 10.1 |
| Comparative Example 8 | Disk-like liquid crystal compound 6 | 3 | Curing agent 1 | 2.5 | BN1 | 5 | N/A | 0.00 | MEK | 5 | 10.5 |
| Comparative Example 9 | Rod-like compound 1 | 3 | Curing agent 1 | 2.5 | BN1 | 5 | N/A | 0.00 | MEK | 5 | 8.1 |
| Comparative Example 10 | Rod-like compound 2 | 3 | Curing agent 1 | 2.5 | BN1 | 5 | N/A | 0.00 | MEK | 5 | 7.3 |

From the results shown in Table 2, it is understood that in all the examples in which an aldehyde compound is used as a surface modifier, the obtained thermal conductivity is higher than that in the comparative examples in which an aldehyde compound is not used.

<Test for Measuring Amount of Sample Adsorbed Onto Inorganic Nitride>

10 mg of each of the samples having the structure described in Table 3 was dissolved in 100 mL of acetonitrile so as to prepare a 1/10 dilution. 0.5 g of boron nitride SGPS manufactured by Denka Company Limited was added to 20 mL of the dilution, and the mixture was stirred for several seconds. By using UV-3100PC manufactured by Shimadzu Corporation, the absorbance of the filtrate was measured before and after the addition of boron nitride, and the total amount of the sample adsorbed was calculated. The measurement wavelength for each of the samples is as shown in Table 3. The total amount of the sample adsorbed was divided by the total surface area calculated from the value described in the catalog of boron nitride SGPS, thereby calculating the adsorption amount. The results are shown in Table 3.

TABLE 3

| Sample No. | Structure | Adsorption amount [μmol/m²] | Measurement wavelength [nm] |
|---|---|---|---|
| 1 | $C_8H_{17}O$—⌬—CHO | 0.005 | 275 |
| 2 | naphthalene-CHO | 0.010 | 282 |
| 3 | naphthalene-CHO | 0.011 | 310 |
| 4 | anthracene-CHO | 0.142 | 398 |
| 5 | terthiophene-CHO | 0.104 | 393 |
| 6 | pyrene-CHO | 0.270 | 361 |
| 7 | triphenylene-CHO | 0.433 | 302 |
| 8 | perylene-CHO | 0.549 | 465 |
| 11 | $(MeO)_3Si$—propyl—NH—phenyl | 0.000 | 250 |

From the results shown in Table 3, it is understood that the larger the number of monocyclic aromatic rings included in the aldehyde compound, the greater the adsorption amount. Furthermore, it is understood that in the structure having a fused ring, the higher the flatness, the greater the adsorption amount.

What is claimed is:

1. A surface-modified inorganic substance obtained by performing surface modification on an inorganic nitride by using an aldehyde compound, wherein the inorganic nitride includes aluminum, or the inorganic nitride is boron nitride,
    wherein the aldehyde compound is a compound represented by General Formula I;

$$Z_Z—X_X—CHO \qquad \text{General Formula I}$$

in the General Formula I, $Z_Z$ represents a group selected from the group consisting of an amino group, a thiol group, a hydroxyl group, an isocyanate group, a carboxyl group, a carboxylic acid anhydride group, an oxetanyl group, an oxiranyl group, and a (meth)acrylate group, and $X_X$ represents a divalent linking group.

2. The surface-modified inorganic substance according to claim 1,
    wherein the aldehyde compound has a structure including two or more non-fused monocyclic aromatic rings or a fused ring in which three or more monocyclic aromatic rings are fused.

3. The surface-modified inorganic substance according to claim 2,
    wherein the aldehyde compound has a structure including a fused ring in which three or more monocyclic aromatic rings are fused.

4. The surface-modified inorganic substance according to claim 1
    wherein the inorganic nitride is aluminum nitride.

5. The surface-modified inorganic substance according to claim 1, wherein the surface modification is modification based on the formation of a covalent bond that the aldehyde compound forms with a surface of the inorganic nitride.

6. A thermally conductive material comprising:
the surface-modified inorganic substance according to claim 1.

7. A sheet consisting of the thermally conductive material according to claim 6.

8. The sheet according to claim 7, wherein the sheet is a heat dissipation sheet.

9. A device comprising:
the thermally conductive material according to claim 6.

10. A lubricant comprising:
the surface-modified inorganic substance according to claim 1.

11. A method for manufacturing the surface-modified inorganic substance according to claim 1, comprising:
making a contact between the aldehyde compound and the inorganic nitride.

12. The manufacturing method according to claim 11,
wherein the contact is made by stirring a solution containing the inorganic nitride and the aldehyde compound.

13. The manufacturing method according to claim 12,
wherein a solvent of the solution is ethyl acetate, methyl ethyl ketone, or dichloromethane.

14. A resin composition comprising:
a surface-modified inorganic substance obtained by performing surface modification on an inorganic nitride by using an aldehyde compound, wherein the inorganic nitride includes aluminum, or the inorganic nitride is boron nitride; and a monomer having a group selected from the group consisting of an oxetanyl group, an oxiranyl group, and a (meth)acrylate group,
wherein the aldehyde compound is a compound represented by General Formula I;

$$Z_Z-X_X-CHO \qquad \text{General Formula I}$$

in the General Formula I, $Z_Z$ represents a group selected from the group consisting of an amino group, a thiol group, a hydroxyl group, an isocyanate group, a carboxyl group, a carboxylic acid anhydride group, an oxetanyl group, an oxiranyl group, and a (meth)acrylate group, and $X_X$ represents a divalent linking group.

15. The resin composition according to claim 14,
wherein the monomer has an oxiranyl group.

16. The resin composition according to claim 15,
wherein in the General Formula I, $Z_Z$ represents a group selected from the group consisting of an amino group, a thiol group, a hydroxyl group, an isocyanate group, a carboxyl group, and a carboxylic acid anhydride group.

17. The resin composition according to claim 15, further comprising:
a curing agent having a group selected from the group consisting of an amino group, a thiol group, a hydroxyl group, an isocyanate group, a carboxyl group, and a carboxylic acid anhydride group.

18. The resin composition according to claim 17,
wherein in the General Formula I, $Z_Z$ represents an oxiranyl group.

19. A thermally conductive material comprising:
a cured substance of the resin composition according to claim 14.

* * * * *